United States Patent
Kang et al.

(10) Patent No.: US 12,192,910 B2
(45) Date of Patent: Jan. 7, 2025

(54) METHOD FOR TRANSMITTING UPLINK SIGNAL IN WIRELESS COMMUNICATION SYSTEM, AND APPARATUS THEREFOR

(71) Applicant: LG ELECTRONICS INC., Seoul (KR)

(72) Inventors: Jiwon Kang, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 17/593,908

(22) PCT Filed: Mar. 26, 2020

(86) PCT No.: PCT/KR2020/004139
§ 371 (c)(1),
(2) Date: Sep. 27, 2021

(87) PCT Pub. No.: WO2020/197292
PCT Pub. Date: Oct. 1, 2020

(65) Prior Publication Data
US 2022/0174609 A1 Jun. 2, 2022

Related U.S. Application Data

(60) Provisional application No. 62/825,752, filed on Mar. 28, 2019.

(51) Int. Cl.
*H04W 52/14* (2009.01)
*H04W 52/36* (2009.01)

(52) U.S. Cl.
CPC ....... *H04W 52/146* (2013.01); *H04W 52/367* (2013.01)

(58) Field of Classification Search
CPC .................... H04W 52/146; H04W 52/367
See application file for complete search history.

(56) References Cited

U.S. PATENT DOCUMENTS

| | | | |
|---|---|---|---|
| 2020/0267660 A1* | 8/2020 | Yokomakura | ......... H04L 5/0053 |
| 2020/0267667 A1* | 8/2020 | MolavianJazi | ..... H04W 52/365 |
| 2020/0296736 A1* | 9/2020 | Yokomakura | ......... H04W 72/12 |

(Continued)

FOREIGN PATENT DOCUMENTS

WO 2018064009 4/2018

OTHER PUBLICATIONS

PCT International Application No. PCT/KR2020/004139, International Search Report dated Jul. 17, 2020, 5 pages.

(Continued)

*Primary Examiner* — Junpeng Chen
(74) *Attorney, Agent, or Firm* — LEE, HONG, DEGERMAN, KANG & WAIMEY

(57) ABSTRACT

Disclosed is a method for transmitting an uplink signal in a wireless communication system according to an embodiment of the present disclosure performed by a User Equipment (UE) includes receiving configuration information in relation to transmission power of an uplink signal, determining the transmission power based on the configuration information, and transmitting the uplink signal based on the determined transmission power.

18 Claims, 20 Drawing Sheets

(56) References Cited

U.S. PATENT DOCUMENTS

2020/0374814 A1* 11/2020 Gong ................ H04L 25/0226
2021/0376985 A1* 12/2021 Zhou ................. H04L 5/0053

OTHER PUBLICATIONS

Motorola Mobility et al., "Power control for multi-panel uplink transmission," 3GPP TSG RAN WG1 #96, R1-1902849, Feb.-Mar. 2019, 5 pages.
ZTE, "Discussion on UL power control for multi-panel operation," 3GPP TSG RAN WG1 #96, R1-1901643, Feb.-Mar. 2019, 3 pages.
LG Electronics, "Discussion on full Tx power uplink transmission," 3GPP TSG RAN WG1 #96, R1-1902093, Feb.-Mar. 2019, 4 pages.
NTT Docomo, Inc., "Discussion on multi-beam enhancement," 3GPP TSG RAN WG1 #96, R1-1902813, Feb.-Mar. 2019, 22 pages.

\* cited by examiner

[FIG. 1]
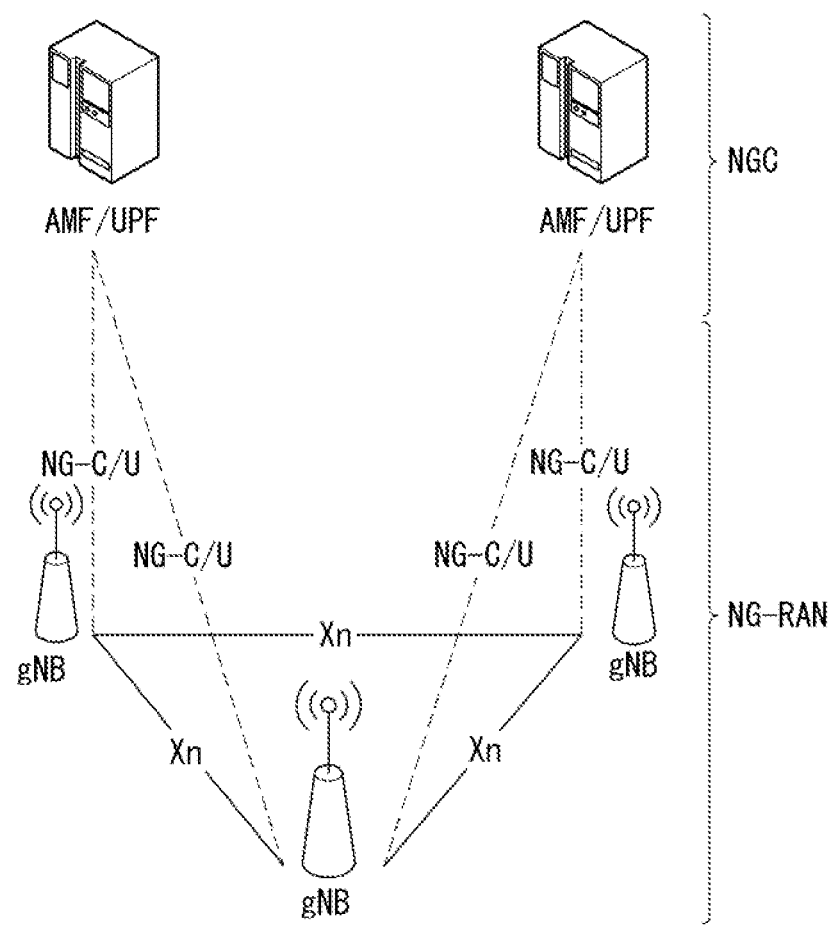

[FIG. 2]
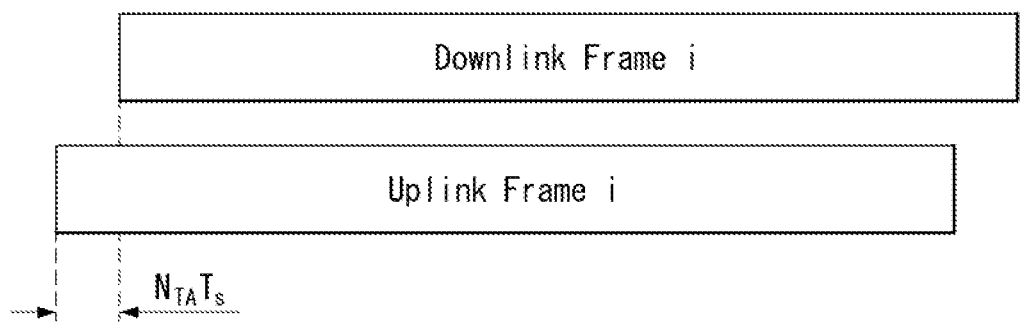

[FIG. 3]
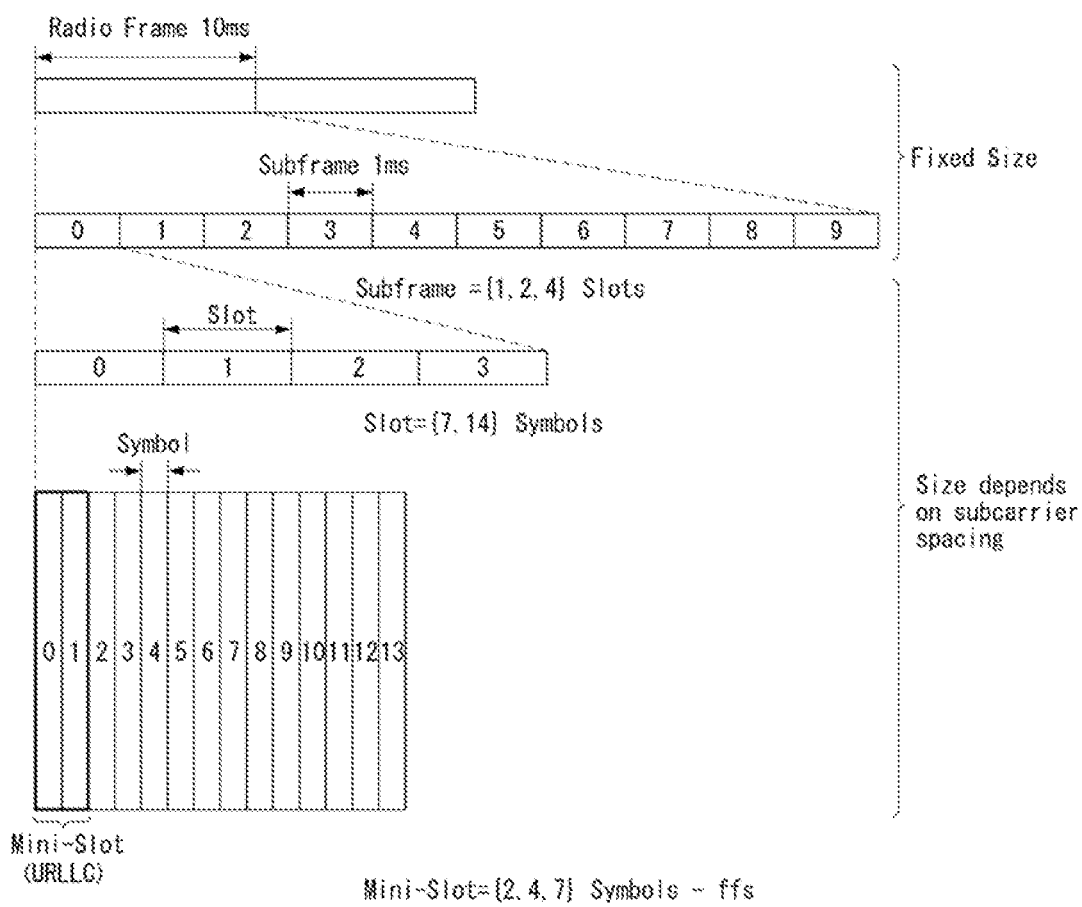

[FIG. 4]
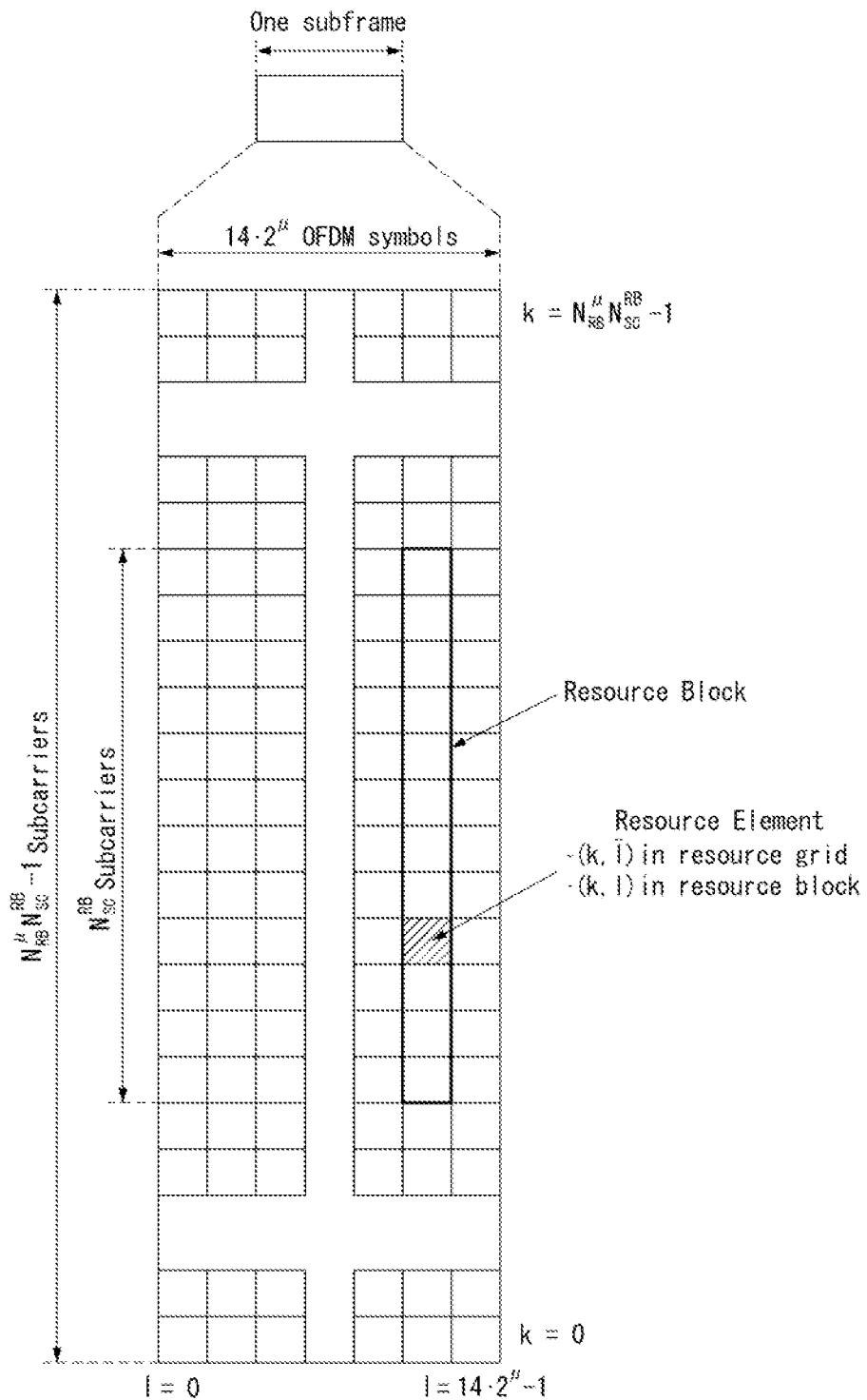

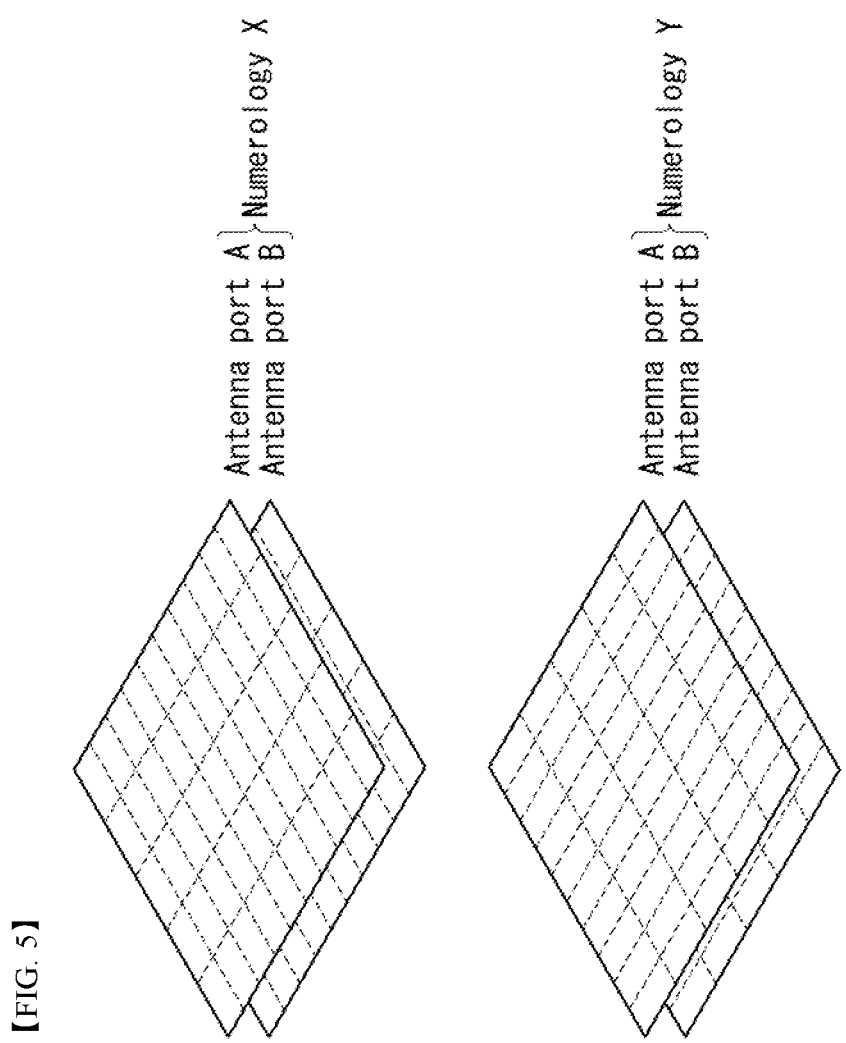

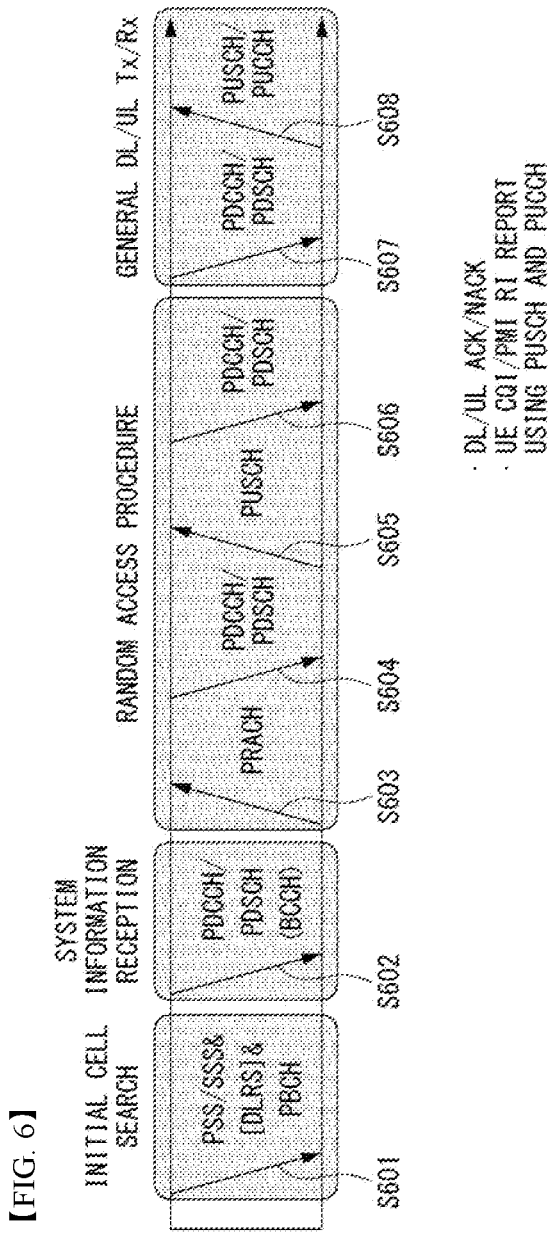
[FIG. 6]

[FIG. 7]
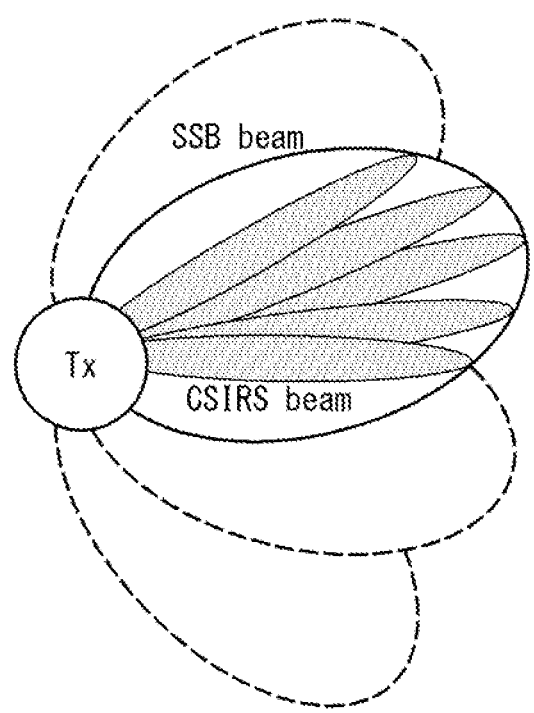

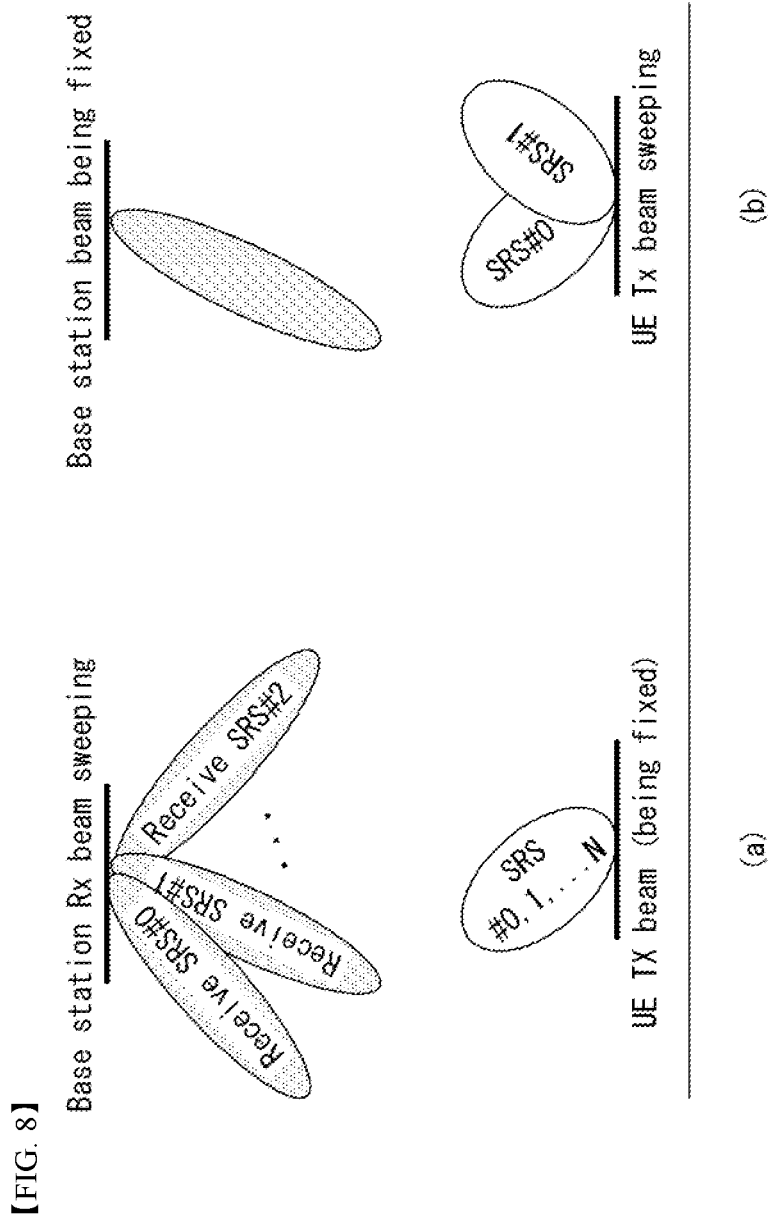
[FIG. 8]

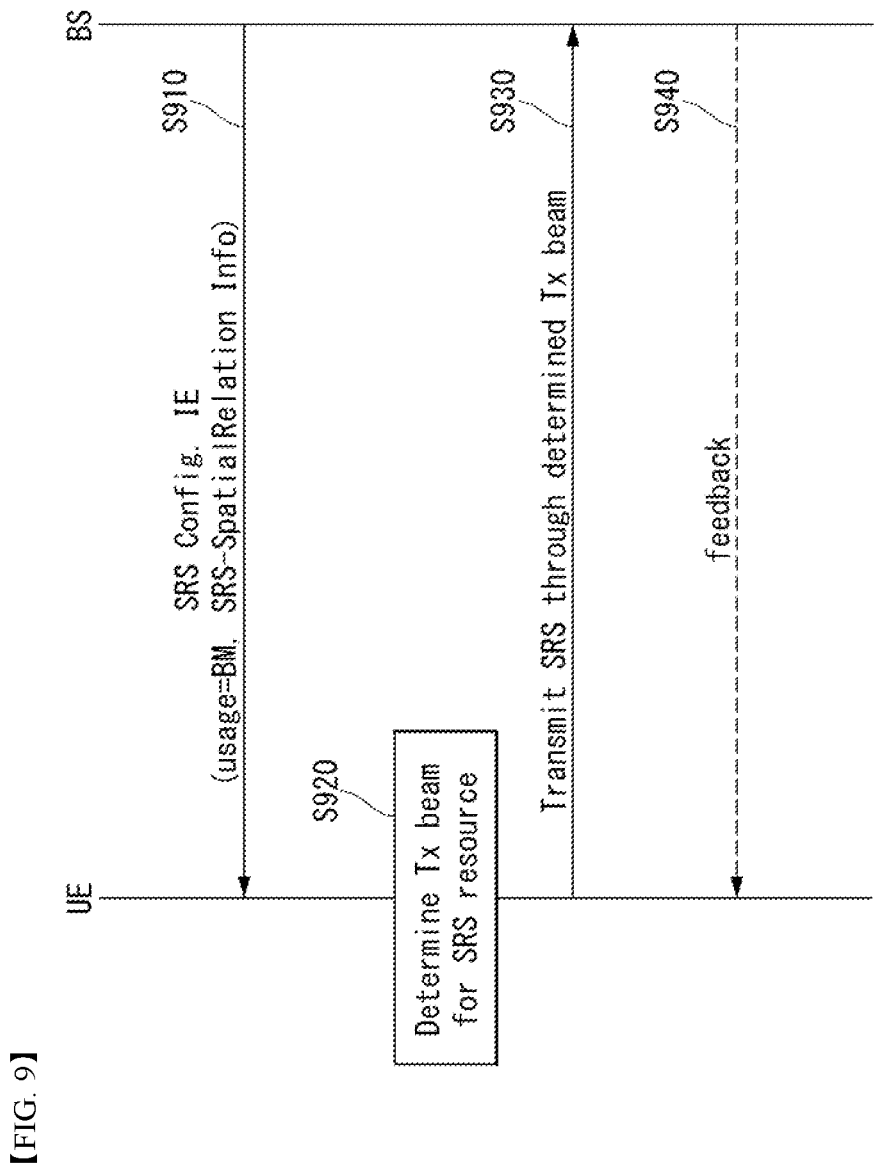
[FIG. 9]

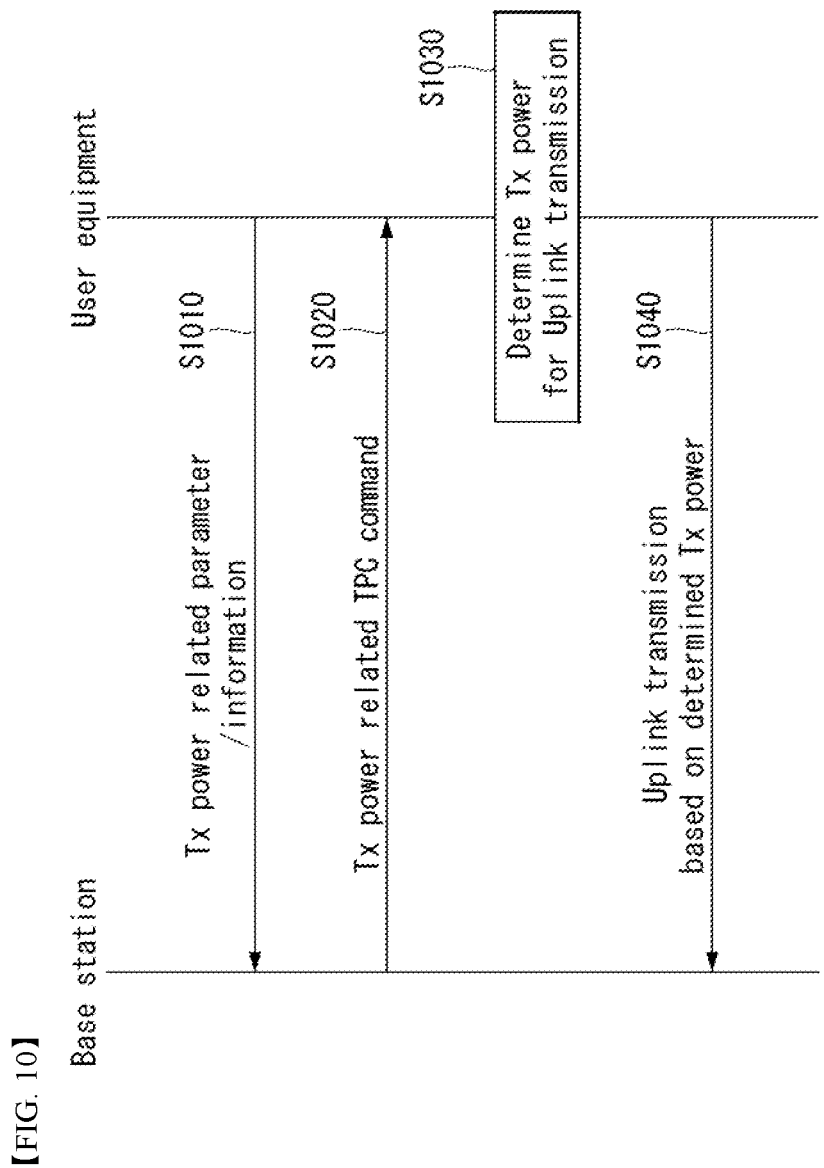
[FIG. 10]

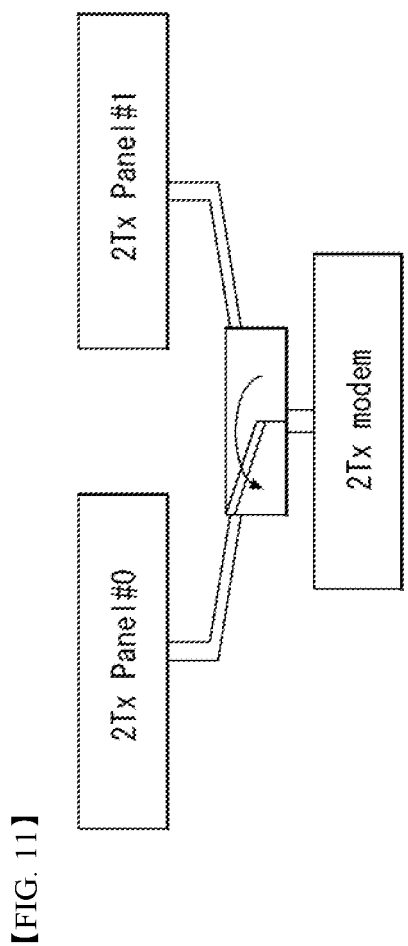
[FIG. 11]

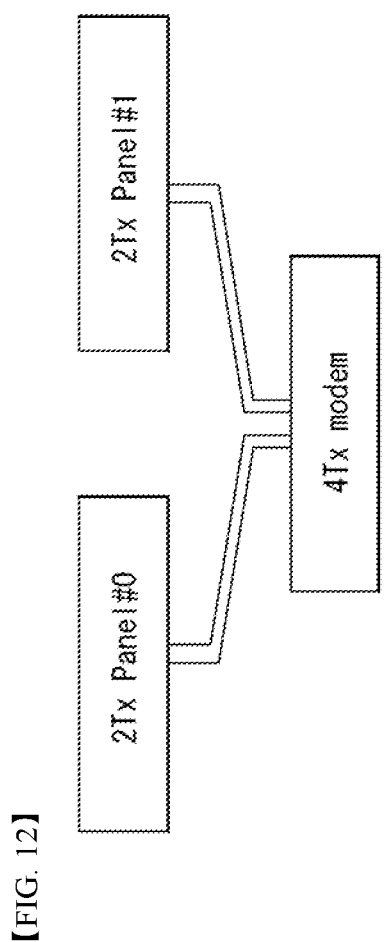
[FIG. 12]

[FIG. 13]
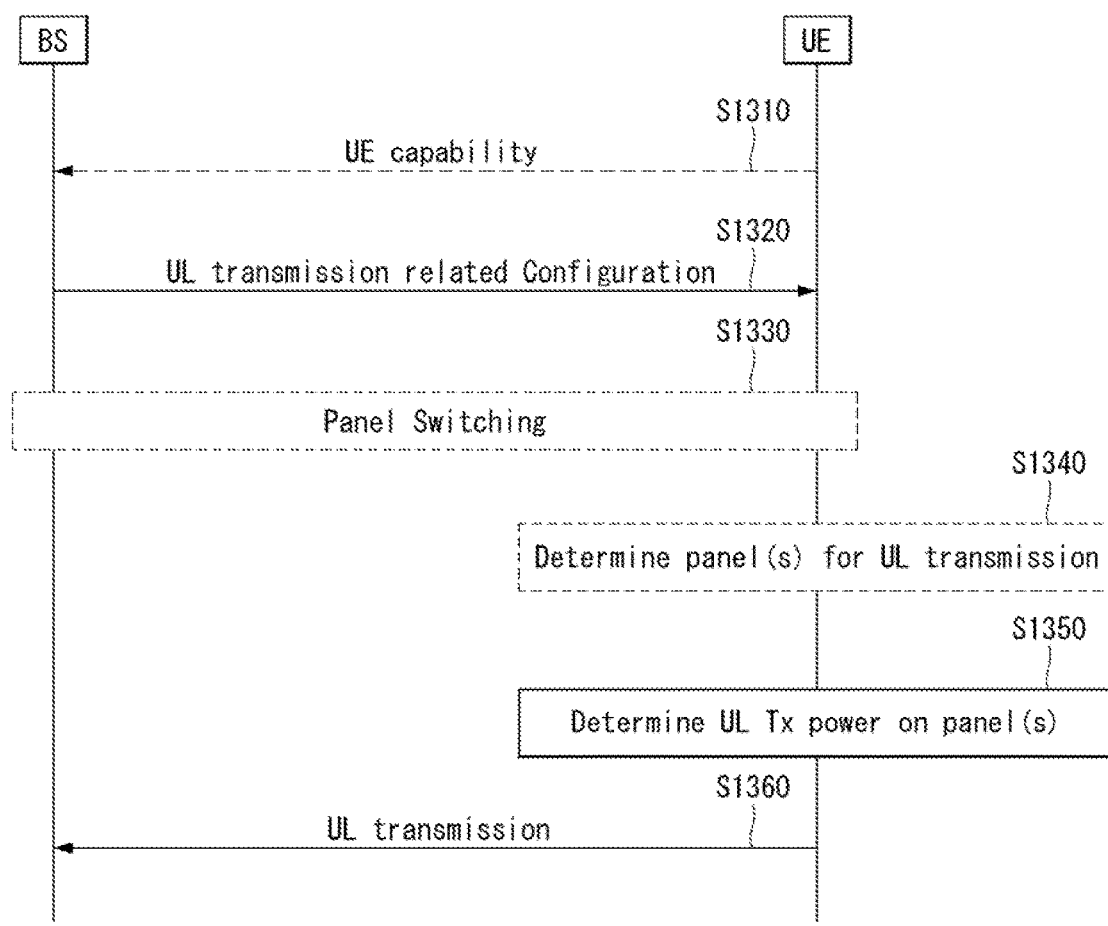

[FIG. 14]
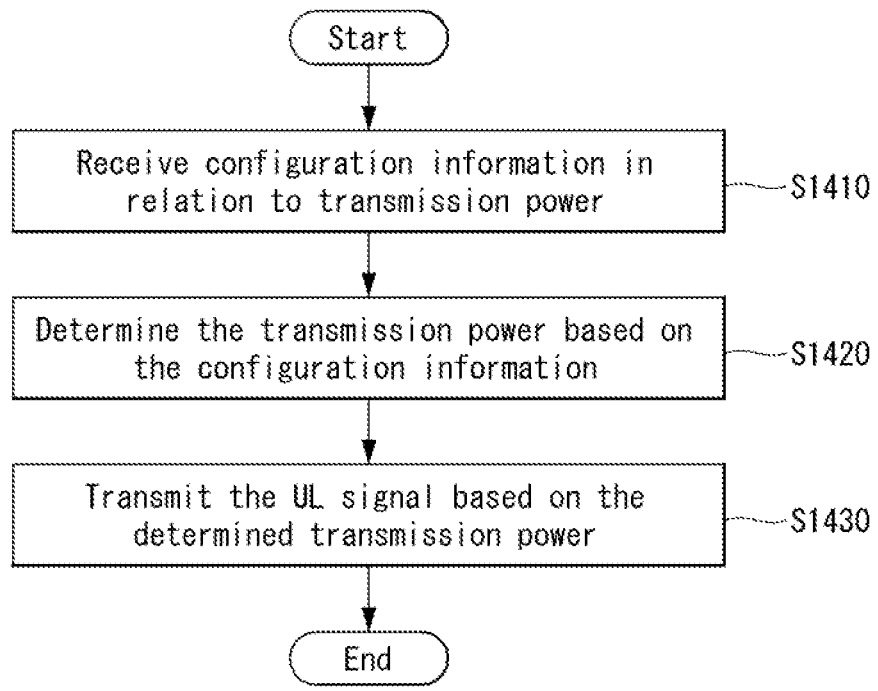

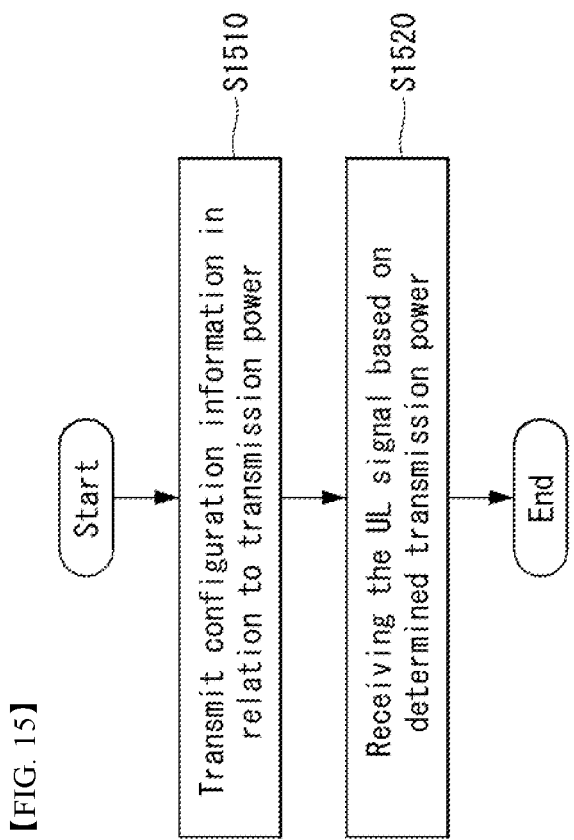
[FIG. 15]

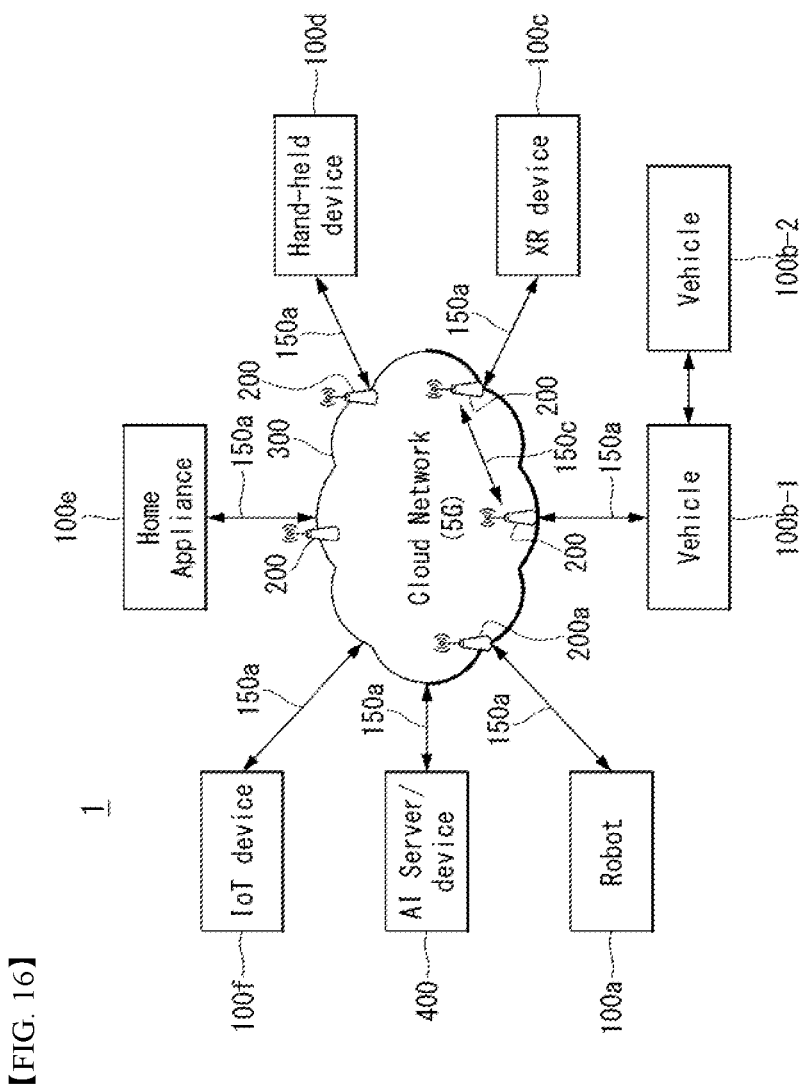
[FIG. 16]

[FIG. 17]
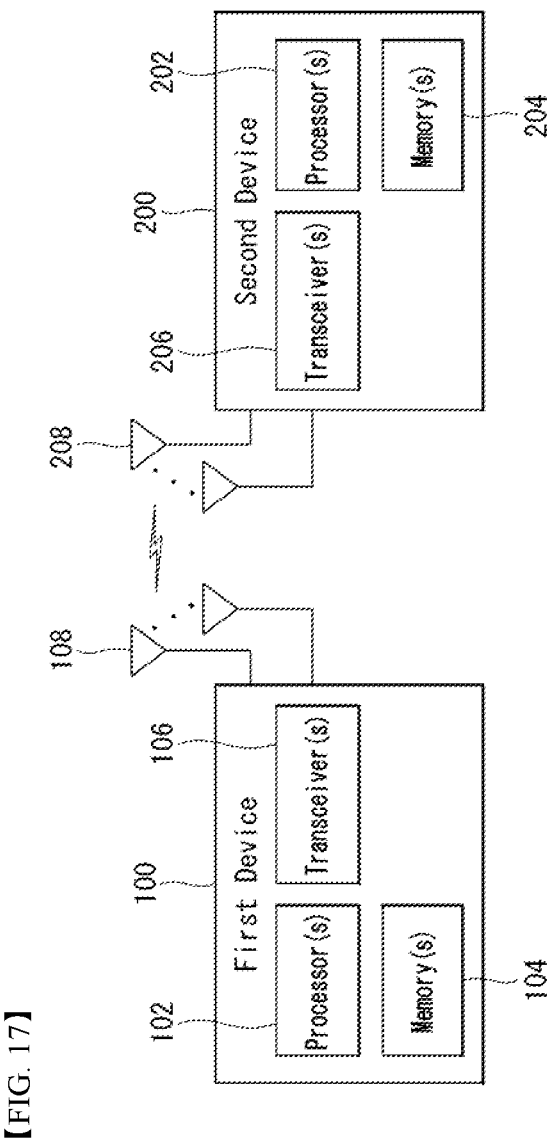

[FIG. 18]
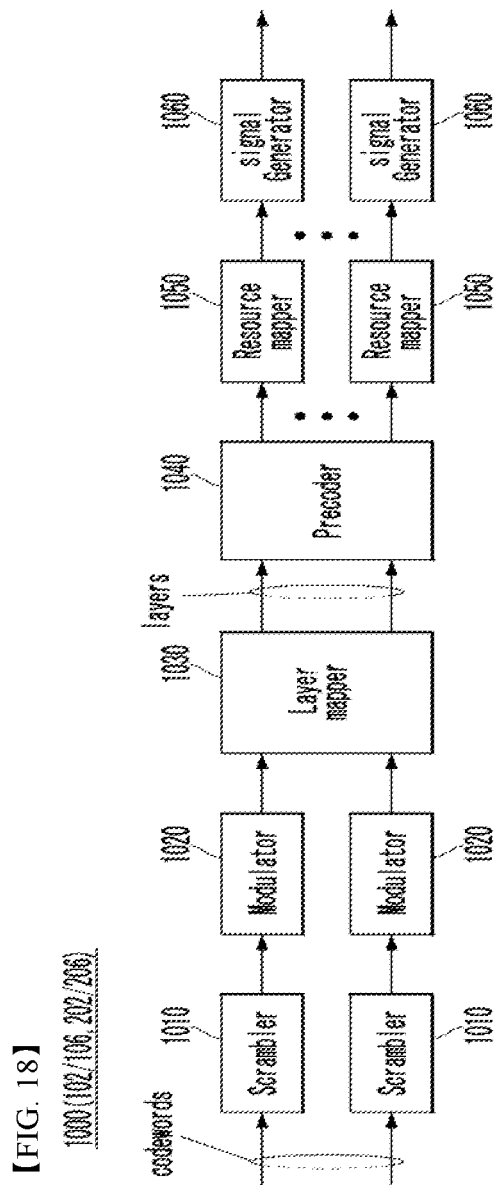

[FIG. 19]
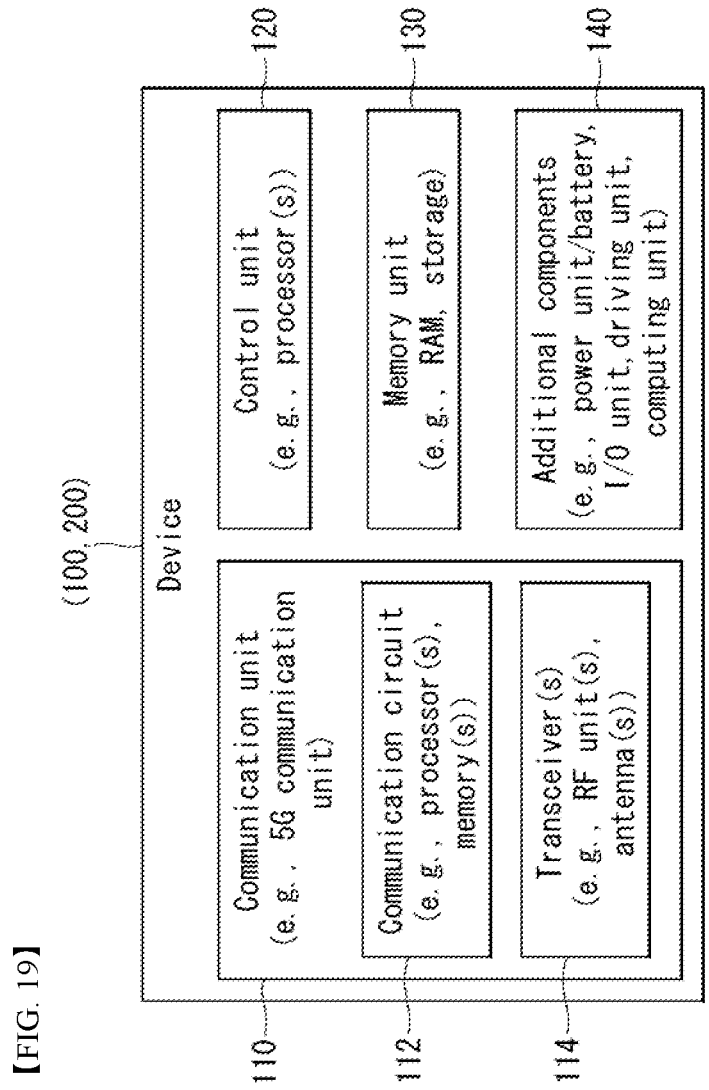

[FIG. 20]
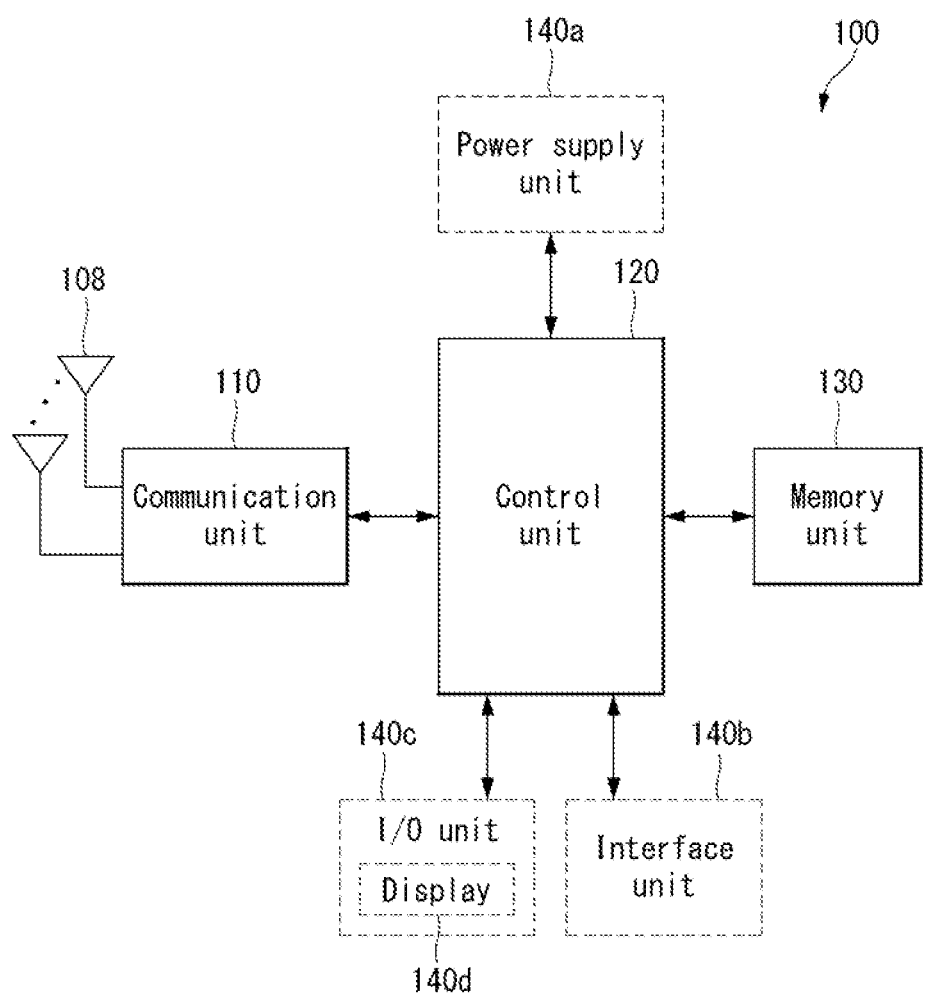

METHOD FOR TRANSMITTING UPLINK SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/004139, filed on Mar. 26, 2020, which claims the benefit of U.S. Provisional Patent Application No. 62/825,752, filed on Mar. 28, 2019, the contents of which are all incorporated by reference herein in their entirety.

TECHNICAL FIELD

The present disclosure relates to a method and apparatus for transmitting an uplink signal in a wireless communication system.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method for transmitting an uplink signal considering an implementation of a power amplifier of a multi-panel User Equipment (UE).

The technical objects of the present disclosure are not limited to the aforementioned technical objects, and other technical objects, which are not mentioned above, will be apparently appreciated by a person having ordinary skill in the art from the following description.

Technical Solution

A method for transmitting an uplink signal in a wireless communication system according to an embodiment of the present disclosure performed by a User Equipment (UE) includes receiving configuration information in relation to transmission power of an uplink signal, determining the transmission power based on the configuration information, and transmitting the uplink signal based on the determined transmission power.

The transmission power is determined for each panel of a plurality of panels of the UE, the uplink signal is transmitted based on at least one panel of the plurality of panels of the UE, the transmission power is determined to be a smaller value between a first transmission power and a second transmission power, the first transmission power is based on a maximum value of a summation of transmission power of each of the plurality of panels, and the second transmission power is a precalculated transmission power based on an index of each of the panels.

The first transmission power may be based on the maximum value and a predetermined coefficient for each of the panels.

The predetermined coefficient may be 1 or an inverse value of the number of activated panels of the plurality of panels.

The predetermined coefficient may be configured based on information configured by a base station.

The method may further include transmitting UE capability information, and the UE capability information may include information representing maximum transmission power of each of the panels or information related to a coefficient to be applied to each of the panels.

The predetermined coefficient may be a value determined based on the maximum transmission power of each of the panels.

The configuration information may include the predetermined coefficient, and the predetermined coefficient may be a value determined based on the maximum transmission power of each of the panels.

The precalculated transmission power may be determined based on a type of the uplink signal.

The uplink signal may be based on one of Physical Uplink Shared Channel (PUSCH), Physical Uplink Control Channel (PUCCH), Sounding Reference Signal (SRS), or Physical Random Access Channel (PRACH).

Based on a condition that a summation of the precalculated transmission powers of the activated panels of the plurality of panels is greater than the maximum value, the second transmission power may be based on a specific value.

The specific value may be based on the precalculated transmission power and a scaling coefficient.

The scaling coefficient may be a value of the maximum value divided by the summation of the precalculated transmission powers.

Based on a condition that a summation of the precalculated transmission powers of the activated panels of the plurality of panels is greater than the maximum value, the second transmission power for specific panels of the plurality of panels may be based on a specific value.

The specific value may be based on a greater value between panel minimum transmission power and the precalculated transmission power decreased by a predetermined value.

The predetermined value may be a value set to each panel of the specific panels, and a summation of the predetermined values for the specific panels may be equal to or smaller than the summation of the precalculated transmission powers minus the maximum value.

The configuration information may include parameters related to the determination of the transmission power.

Based on a change of the panel for transmitting the uplink signal, a value of the parameters may be maintained as a same value before the change of the panel or changed to a value set to default.

A user equipment (UE) for transmitting an uplink signal in a wireless communication system according to another embodiment of the present disclosure includes one or more transceivers, one or more processors, and one or more memories operably accessible to the one or more processors, and configured to store instructions for operations when transmission of the uplink signal is performed by the one or more processors.

The operations include receiving configuration information in relation to transmission power of an uplink signal, determining the transmission power based on the configuration information, and transmitting the uplink signal based on the determined transmission power.

The transmission power is determined for each panel of a plurality of panels of the UE, the uplink signal is transmitted based on at least one panel of the plurality of panels of the UE, the transmission power is determined to be a smaller value between a first transmission power and a second transmission power, the first transmission power is based on a maximum value of a summation of transmission power of each of the plurality of panels, and the second transmission power is a precalculated transmission power based on an index of each of the panels.

An apparatus according to a still another embodiment of the present disclosure includes one or more memories and one or more processors functionally connected to the one or more memories.

The one or more processors are configured to perform receiving configuration information in relation to transmission power of an uplink signal, determining the transmission power based on the configuration information, and transmitting the uplink signal based on the determined transmission power.

The transmission power is determined for each panel of a plurality of panels of the UE, the uplink signal is transmitted based on at least one panel of the plurality of panels of the UE, the transmission power is determined to be a smaller value between a first transmission power and a second transmission power, the first transmission power is based on a maximum value of a summation of transmission power of each of the plurality of panels, and the second transmission power is a precalculated transmission power based on an index of each of the panels.

One or more non-transitory computer readable medium according to still another embodiment of the present disclosure stores one or more commands.

The one or more commands executable by one or more processors are configured for a User Equipment (UE) to perform receiving configuration information in relation to transmission power of an uplink signal, determining the transmission power based on the configuration information, and transmitting the uplink signal based on the determined transmission power.

The transmission power is determined for each panel of a plurality of panels of the UE, the uplink signal is transmitted based on at least one panel of the plurality of panels of the UE, the transmission power is determined to be a smaller value between a first transmission power and a second transmission power, the first transmission power is based on a maximum value of a summation of transmission power of each of the plurality of panels, and the second transmission power is a precalculated transmission power based on an index of each of the panels.

Advantageous Effects

According to an embodiment of the present disclosure, the transmission power of an uplink signal is determined for each panel of a plurality of panels of a UE. The transmission power is determined to be a smaller value between a first transmission power and a second transmission power, and the first transmission power is based on a maximum value of a summation of transmission power of each of the plurality of panels, and the second transmission power is a precalculated transmission power based on an index of each of the panels.

Therefore, the uplink transmission power may be controlled to be proper for the implementation scheme of various multi-panel schemes and the power amplifier (PA) implementation scheme. In addition, not only the transmission power of each panel, but also the transmission power of the entire panels may be controlled together to be maintained as a value in the range which does not influence a body.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 illustrates an example of a procedure for controlling UL transmission power to which the method proposed in the present disclosure is applicable.

FIGS. 11 and 12 illustrate a multiple-panel based on an RF switch applied to the present disclosure.

FIG. 13 is a flowchart for describing a multiple-panel based UL transmission and reception signaling procedure to which the method proposed in the present disclosure is applicable.

FIG. 14 is a flowchart for describing a method for a UE to transmit a UL signal in a wireless communication system according to an embodiment of the present disclosure.

FIG. 15 is a flowchart for describing a method for a BS to receive a UL signal in a wireless communication system according to another embodiment of the present disclosure.

FIG. 16 illustrates a communication system 1 applied to the present disclosure.

FIG. 17 illustrates wireless devices applicable to the present disclosure.

FIG. 18 illustrates a signal process circuit for a transmission signal.

FIG. 19 illustrates another example of a wireless device applied to the present disclosure.

FIG. 20 illustrates a hand-held device applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3 GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^μ \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=\Delta f_{max} \cdot N_f$ where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_s=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA} T_s$ earlier than the start of the downlink frame by the UE.

For numerology μ, slots are numbered in ascending order of $n_s^\mu \in \{0, \ldots, N_{subframe}^{slots, \mu}-1\}$ in the subframe and in ascending order of $n_{s,f}^\mu \in \{0, \ldots, N_{frame}^{slots, \mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ slot of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k, l̄) is used to refer to a resource element in a slot, where l=0, . . . , $N_{symb}^{\mu}-1$.

The resource element (k, l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l̄) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Physical Channel and General Signal Transmission

FIG. 5 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S501). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S502).

Meanwhile, when there is no radio resource first accessing the eNB or for signal transmission, the UE may perform a Random Access Procedure (RACH) to the eNB (S503 to S506). To this end, the UE may transmit a specific sequence to a preamble through a Physical Random Access Channel (PRACH) (S503 and S505) and receive a response message (Random Access Response (RAR) message) for the preamble through the PDCCH and a corresponding PDSCH. In the case of a contention based RACH, a Contention Resolution Procedure may be additionally performed (S506).

The UE that performs the above procedure may then perform PDCCH/PDSCH reception (S507) and Physical Uplink Shared Channel (PUSCH)/Physical Uplink Control Channel (PUCCH) transmission (S508) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TC-State ::=          SEQUENCE {
  tci-StateId           TCI-StateId,
  qcl-Type1             QCL-Info,
  qcl-Type2             QCL-Info
  ...
}
QCL-Info ::=          SEQUENCE {
  cell                  ServCellIndex
  bwp-Id                BWP-Id
  referenceSignal       CHOICE {
    csi-rs                NZP-CSI-RS-ResourceId,
    ssb                   SSB-Index
  },
  qcl-Type            ENUMERATED {typeA, typeB, typeC, typeD},
  ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                          SEQUENCE {
    srs-ResourceSetToReleaseList          SEQUENCE (SIZE(1..maxNrofSRS-
ResourceSets)) OF SRS-ResourceSetId       OPTIONAL,  -- Need N
    srs-ResourceSetToAddModList           SEQUENCE (SIZE(1..maxNrofSRS-
ResourceSets)) OF SRS-ResourceSet         OPTIONAL,  -- Need N
    srs-ResourceToReleaseList             SEQUENCE (SIZE(1..maxNrofSRS-
Resources)) OF SRS-ResourceId             OPTIONAL, -- Need N
    srs-ResourceToAddModList              SEQUENCE (SIZE(1..maxNrofSRS-
Resources)) OF SRS-Resource               OPTIONAL,  -- Need N
    tpc-Accumulation                      ENUMERATED {disabled}
    ...
}
```

TABLE 6-continued

```
SRS-ResourceSet ::=                         SEQUENCE {
   srs-ResourceSetId                           SRS-ResourceSetId,
   srs-ResourceIdList                          SEQUENCE (SIZE(1..maxNrofSRS-
ResourcesPerSet)) OF SRS-ResourceId         OPTIONAL, -- Cond Setup
   resourceType                                CHOICE {
      aperiodic                                   SEQUENCE {
         aperiodicSRS-ResourceTrigger                 INTEGER (1..maxNrofSRS-
TriggerStates-1),
         csi-RS                                       NZP-CSI-RS-ResourceId
         slotOffset                                   INTEGER (1..32)
         ...
      },
      semi-persistent                             SEQUENCE {
         associatedCSI-RS                             NZP-CSI-RS-ResourceId
         ...
      },
      periodic                                    SEQUENCE {
         associatedCSI-RS                             NZP-CSI-RS-ResourceId
         ...
      }
   },
   usage                                       ENUMERATED {beamManagement,
                                               codebook, nonCodebook, antennaSwitching},
   alpha                                       Alpha
   p0                                          INTEGER (-202..24)
   pathlossReferenceRS                         CHOICE {
      ssb-Index                                   SSB-Index,
      csi-RS-Index                                NZP-CSI-RS-ResourceId
SRS-SpatialRelationInfo ::=                 SEQUENCE {
   servingCellId                               ServCellIndex
   referenceSignal                             CHOICE {
      ssb-Index                                   SSB-Index,
      csi-RS-Index                                NZP-CSI-RS-ResourceId,
      srs                                         SEQUENCE {
         resourceId                                   SRS-ResourceId,
         uplinkBWP                                    BWP-Id
      }
   }
}
SRS-ResourceId ::=                          INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

PUCCH Beam Indication

When the base station indicates, to the UE, a beam for use in PUCCH transmission, spatial relation info may be indicated/configured like the SRS. Spatial relation info may be SSB, CSI-RS, or SRS like SRS and provides reference RS information from the viewpoint of a beam to be used for PUCCH transmission as a target. In the case of PUCCH, a beam may be (differently) configured/indicated in units of PUCCH resources, and two schemes are supported. The first scheme is a method for always applying the corresponding spatial relation RS if transmitting the corresponding PUCCH if one spatial relation info is configured with the RRC message (i.e., RRC only). The second scheme is a method for indicating a specific one to be applied to a target PUCCH resource among a plurality of spatial relation RS information configured as RRC with a MAC-CE message after configuring two or more spatial relation info with an RRC message (that is, RRC+MAC-CE).

PUSCH Beam Indication

When the base station indicates, to the UE, a beam to be used for PUSCH transmission, with DCI format 0_1, an SRS resource serving as a reference may be indicated. In NR PUSCH transmission, two schemes are supported: a codebook (CB) based transmission scheme and a non-codebook based transmission scheme. Similar to LTE UL MIMO, the CB based transmission scheme indicates precoder information to be applied to a plurality of UE antenna ports to DCI through TPMI and TRI. However, unlike LTE, beamformed SRS resource transmission may be supported, and up to two SRS resources may be configured for CB based transmission. Since each SRS resource may be configured with different spatial relation info, it may be transmitted while beamformed in different directions. The base station receiving this may designate one of the two beams to be used when applying the PUSCH as a 1-bit SRS resource ID (SRI) field of DCI. For example, if a 4 Tx UE is configured with two 4-port SRS resources and each SRS resource is configured with a different spatial relation RS, each SRS resource is beamformed according to each spatial relation RS and each is transmitted to 4 ports. The base station selects and indicates one of the two SRS resources as SRI while simultaneously indicating TPMI and TRI together, as MIMO precoding information to be applied to SRS ports, which have been used for SRS resource transmission, as UL DCI. In non-CB based transmission, the UE may be configured with up to 4 1-port SRS resources. The UE indicated with this beamforms each SRS resource according to the spatial relation info and transmits it to the base station. Upon receiving it, the base station indicates one or more SRI(s) to be applied for PUSCH transmission. Unlike the CB based scheme, in the non-CB scheme, each SRS resource is configured with only 1 port, so that TPMI is not indicated. Resultantly, the number of SRS resources indicated (i.e., the number of SRIs) becomes identical to the transmission rank, and thus, the TRI is not indicated. As a result, the same beamforming (precoding) as a specific PUSCH DMRS port (or layer) is applied to each indicated 1 port SRS resource. In non-CB UL transmission, a specific NZP CSI-RS resource may be associated with each SRS resource by RRC (associatedCSI-RS IE in 38.331) and, when so configured, the associated NZP CSI-RS is also triggered when the aperiodic SRS for non-CB is triggered with DCI. In this case, the UE receives the triggered NZP CSI-RS, calculates a beam coefficient (or precoder) to be applied to each SRS resource (using channel reciprocity), and then transmits the SRS resources (sequentially).

When the base station schedules the PUSCH in DCI format 0_0, the direct beam indication method through DCI is not supported because the SRI field in the CB based or non-CB based transmission does not exist in DCI format 0_0. In this case, the UE transmits the corresponding PUSCH using the same beam as the beam to be applied to transmission of the PUCCH resource having the lowest ID among the PUCCH resources configured in the active BWP of the corresponding cell (that is, the spatial relation info is the same).

Uplink Power Control

In a wireless communication system, depending on a situation, the transmission power of a User Equipment (UE) and/or a mobile device may be required to be increased or decreased. As such, the control of the transmission power of the UE and/or the mobile device may be referred to as uplink power control. In one example, the transmission power control scheme may be applied to satisfy the requirements (SNR (Signal-to-Noise Ratio), BER (Bit Error Ratio), BLER (Block Error Ratio), etc.) of a base station (BS) (e.g., gNB, eNB, etc.).

The power control described above may be performed in an open-loop power control scheme and a closed-loop power control scheme.

Particularly, the open-loop power control scheme means a scheme of controlling transmission power without the feedback from a transmission device (e.g., base station, etc.) to a reception device (e.g., UE, etc.) and/or the feedback from a reception device to a transmission device. In one example, a UE may receive a specific channel/signal (pilot channel/signal) from a BS and estimate a strength of reception power by using the channel/signal. Thereafter, the UE may control transmission power by using the strength of reception power.

On the other hand, the closed-loop power control scheme means a scheme of controlling transmission power based on the feedback from a transmission device to a reception device and/or the feedback from a reception device to a transmission device. In one example, a BS may receive a specific channel/signal from a UE and determine an optimal power level of the UE based on a power level, SNR, BER, BLER, and the like, measured by the received specific channel/signal. The BS may forward information (i.e., feedback) for the determined optimal power level to the UE through a control channel, and the UE may control transmission power by using the feedback provided by the BS.

Hereinafter, the power control scheme for the cases in which a UE and/or a mobile device performs uplink transmission to a BS in a wireless communication system will be described in detail.

Particularly, hereinafter, the power control schemes are described for transmission of 1) UL data channel (e.g., PUSCH (Physical Uplink Shared Channel)), 2) UL control channel (e.g., PUCCH (Physical Uplink Control Channel)), 3) Sounding Reference Signal (SRS), and 4) random access channel (e.g., PRACH (Physical Random Access Channel)). In this case, the transmission occasion (i.e., transmission time unit) (i) for PUSCH, PUCCH, SRS and/or PRACH may be defined by a slot index ($n_s$), the first symbol (S) in a slot, the number of consecutive symbols (L) of a system frame number (SFN).

1) Power Control of UL Data Channel

Hereinafter, for the convenience of description, the power control scheme is described based on the case in which a UE performs PUSCH transmission. The scheme may be extendedly applied to other uplink data channels supported in a wireless communication system.

In the case of PUSCH transmission in an activated UL bandwidth part (UL BWP) of a carrier (f) in a serving cell (c), a UE may calculate a linear power value of transmission power which is determined by Equation 3 below. Thereafter, the UE may control the transmission power by considering the number of antenna ports and/or the number of SRS ports.

Particularly, in the case that the UE performs PUSCH transmission in the activated UL BWP (b) of the carrier (f) in the serving cell (c) by using the parameter set configuration based on index j and the PUSCH power control adjustment state based on index 1, the UE may determine the PUSCH transmission power $P_{PUSCH,b,f,c}(i, j, q_d, l)$ (dBm) in the PUSCH transmission occasion (i) based on Equation 3 below.

consideration of interference and/or data rates between the UEs. Furthermore, $P_{CMAX, f, c}(i)$ may represent a set UE transmission power. For example, the set UE transmission power may be interpreted as the 'configured maximum UE output power' defined in 3GPP TS 38.101-1 and/or TS38.101-2. Furthermore, $M_{RB,b,f,c}^{PUSCH}(i)$ may represent a bandwidth of PUSCH resource allocations expressed as the number of resource blocks (RBs) for a PUSCH transmission occasion based on subcarrier spacing (μ). In addition, $f_{b,f,c}$ (i, l) related to PUSCH power control adjustment state may be set or indicated based on a TPC command field of DCI (e.g., DCI format 0_0, DCI format 0_1, DCI format 2_2, DCI format2_3, etc.).

In this case, a specific RRC (Radio Resource Control) parameter (e.g., SRI-PUSCHPowerControl-Mapping, etc.) may denote a linkage between SRI (SRS Resource Indicator) field of DCI (downlink control information) and indexes $$P_{PUSCH,b,f,c}(i, j, q_d, l) = \min\begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} \quad [\text{Equation 3}]$$

[dBm]

In Equation 3, index j represents an index for an open-loop power control parameter (e.g., Po, alpha (α), etc.), and up to 32 parameter sets per cell may be set. Index $q_d$ represents an index of a DL RS resource for the pathloss (PL) measurement (e.g., $PL_{b, f, c}(q_d)$), and up to 4 measurement values per cell may be set. Index 1 represents an index for a closed-loop power control process, and up to 2 processes per cell may be set.

Particularly, Po (e.g., $P_{O\_PUSCH, b, f, c}(j)$) may be a parameter broadcasted as a part of system information and represent a target reception power at a receiving side. The Po value may be set in consideration of a throughput of UE, a capacity of cell, a noise and/or interference. Furthermore, alpha (e.g., $\alpha_{b, f, c}(j)$) may represent a ratio of performing compensation for pathloss. The alpha may be set to a value from 0 to 1, and according to the set value, full pathloss compensation or fractional pathloss compensation may be performed. In this case, the alpha value may be set in j, $q_d$, and l. In other words, the indexes j, l, $q_d$ and the like described above may be associated with a beam, a panel, and/or a spatial domain transmission filter based on specific information. Through this, the PUSCH transmission power control of the beam, panel, and/or spatial domain transmission filter unit may be performed.

The parameters and/or information for PUSCH power control described above may be individually (i.e., independently) set for each BWP. In this case, the parameters and/or information may be set or indicated through higher layer signaling (e.g., RRC signaling, MAC-CE (Medium Access Control-Control Element), etc.) and/or DCI. For example, the parameters and/or information for PUSCH power control may be transmitted through RRC signaling PUSCH-ConfigCommon, PUSCH-PowerControl, and the like, and PUSCH-ConfigCommon and PUSCH-PowerControl may be configured as represented in Table 7 below.

TABLE 7

| | |
|---|---|
| PUSCH-ConfigCommon ::= | SEQUENCE { |
| groupHoppingEnabledTransformPrecoding | ENUMERATED {enabled} |
| pusch-TimeDomainAllocationList | PUSCH-TimeDomainResourceAllocationList |
| msg3-DeltaPreamble | INTEGER (−1..6) |
| p0-NominalWithGrant | INTEGER (−202..24) |
| ... | |
| } | |
| PUSCH-PowerControl ::= | SEQUENCE { |
| tpc-Accumulation | ENUMERATED { disabled } |
| msg3-Alpha | Alpha |
| p0-NominalWithoutGrant | INTEGER (−202..24) |
| p0-AlphaSets | SEQUENCE (SIZE (1..maxNrofP0-PUSCH-AlphaSets)) OF P0-PUSCH-AlphaSet |
| pathlossReferenceRSToAddModList | SEQUENCE (SIZE (1..maxNrofPUSCH-PathlossReferenceRSs)) OF PUSCH-PathlossReferenceRS |
| pathlossReferenceRSToReleaseList | SEQUENCE (SIZE (1..maxNrofPUSCH-PathlossReferenceRSs)) OF PUSCH-PathlossReferenceRS-Id |

TABLE 7-continued

| | |
|---|---|
| twoPUSCH-PC-AdjustmentStates | ENUMERATED {two States} |
| deltaMCS | ENUMERATED {enabled} |
| sri-PUSCH-MappingToAddModList | SEQUENCE (SIZE (1..maxNrofSRI-PUSCH-Mappings)) OF SRI-PUSCH-PowerControl |
| sri-PUSCH-MappingToReleaseList | SEQUENCE (SIZE (1..maxNrofSRI-PUSCH-Mappings)) OF SRI-PUSCH-PowerControlId |
| } | |

The UE may determine or calculate PUSCH transmission power through the above-described scheme and transmit PUSCH by using the determined or calculated PUSCH transmission power.

2) Power Control of UL Control Channel

Hereinafter, for the convenience of description, a power control scheme based on the case in which a UE performs PUCCH transmission is described. The scheme may be extendedly applied to other uplink control channels supported by a wireless communication system.

Specifically, in the case that the UE performs PUCCH transmission in an activated UL BWP (b) of a carrier (f) of a primary cell (or secondary cell) (c) using power control adjustment state based on index 1, the UE may determine PUCCH transmission power $P_{PUCCH,b,f,c}(i, q_u, q_d, l)$ (dBm) at PUCCH transmission occasion (i) based on Equation 4 below.

$$P_{PUCCH,b,f,c}(i, q_u, q_d, l) = \min\begin{cases} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{cases}$$

[Equation 4]

[dBm]

In Equation 4, $q_u$ represents an index for an open-loop power control parameter (e.g., Po, etc.), and up to 8 parameter sets per cell may be set. Index $q_d$ represents an index of a DL RS resource for the pathloss (PL) measurement (e.g., $PL_{b,f,c}(q_d)$), and up to 4 measurement values per cell may be set. Index l represents an index for a closed-loop power control process, and up to 2 processes per cell may be set.

Particularly, Po (e.g., $P_{O\_PUCCH, b,f,c}(q_u)$) may be a parameter broadcasted as a part of system information and represent a target reception power at a receiving side. The Po value may be set in consideration of a throughput of UE, a capacity of cell, a noise and/or interference. Furthermore, $P_{CMAX,b,f,c}(i)$ may represent a set UE transmission power. For example, the set UE transmission power may be interpreted as the 'configured maximum UE output power' defined in 3GPP TS 38.101-1 and/or TS38.101-2. Furthermore, $M_{RB,b,f,c}^{PUCCH}$ may represent a bandwidth of PUCCH resource allocations expressed as the number of resource blocks (RBs) for a PUCCH transmission occasion based on subcarrier spacing (μ). In addition, the delta function (e.g., $\Delta_{F\_PUCCH}(F)$ and $\Delta_{TF,b,f,c}(i)$) may be set in consideration of a PUCCH format (e.g., PUCCH formats 0, 1, 2, 3, 4, etc.). In addition, $g_{b,f,c}(i, l)$ related to PUCCH power control adjustment state may be set or indicated based on a TPC command field of DCI (e.g., DCI format 1_0, DCI format 1_1, DCI format 2_2, etc.) received or detected by the UE.

In this case, a specific RRC (Radio Resource Control) parameter (e.g., PUCCH-SpatialRelationInfo, etc.) and/or a specific MAC-CE command (e.g., PUCCH spatial relation Activation/Deactivation, etc.) may be used to activate or deactivate a linkage between the PUCCH resource and indexes $q_u$, $q_d$, and l. For example, the PUCCH spatial relation Activation/Deactivation command in MAC-CE may activate or deactivate a linkage between the PUCCH resource and indexes $q_u$, $q_d$, and l based on the RRC parameter PUCCH-SpatialRelationInfo. In other words, the indexes $q_u$, $q_d$, l, and the like described above may be associated with a beam, a panel, and/or a spatial domain transmission filter based on specific information. Through this, the PUCCH transmission power control of the beam, panel, and/or spatial domain transmission filter unit may be performed.

The parameters and/or information for PUCCH power control described above may be individually (i.e., independently) set for each BWP. In this case, the parameters and/or information may be set or indicated through higher layer signaling (e.g., RRC signaling, MAC-CE, etc.) and/or DCI. For example, the parameters and/or information for PUCCH power control may be transmitted through RRC signaling PUCCH-ConfigCommon, PUCCH-PowerControl, and the like, and PUCCH-ConfigCommon and PUCCH-PowerControl may be configured as represented in Table 8 below.

TABLE 8

| | |
|---|---|
| PUCCH-ConfigCommon ::= | SEQUENCE { |
| pucch-ResourceCommon | INTEGER (0..15) |
| pucch-GroupHopping | ENUMERATED { neither, enable, disable }, |
| hoppingId | INTEGER (0..1023) |
| p0-nominal | INTEGER (−202..24) |
| ... | |
| } | |
| PUCCH-PowerControl ::= | SEQUENCE { |
| deltaF-PUCCH-f0 | INTEGER (−16..15) |
| deltaF-PUCCH-f1 | INTEGER (−16..15) |
| deltaF-PUCCH-f2 | INTEGER (−16..15) |
| deltaF-PUCCH-f3 | INTEGER (−16..15) |
| deltaF-PUCCH-f4 | INTEGER (−16..15) |
| p0-Set | SEQUENCE (SIZE (1..maxNrofPUCCH-P0-PerSet)) OF P0-PUCCH |
| pathlossReferenceRSs | SEQUENCE (SIZE (1..maxNrofPUCCH-PathlossReferenceRSs)) OF PUCCH-PathlossReferenceRS |
| twoPUCCH-PC-AdjustmentStates | ENUMERATED {twoStates} |
| ... | |
| } | |
| P0-PUCCH ::= | SEQUENCE { |
| p0-PUCCH-Id | P0-PUCCH-Id, |
| p0-PUCCH-Value | INTEGER (−16..15) |
| } | |
| P0-PUCCH-Id ::= | INTEGER (1..8) |
| PUCCH-PathlossReferenceRS ::= | SEQUENCE { |
| pucch-PathlossReferenceRS-Id | PUCCH-PathlossReferenceRS-Id, |
| referenceSignal | CHOICE { |
| ssb-Index | SSB-Index, |
| csi-RS-Index | NZP-CSI-RS-ResourceId |
| } | |
| } | |

The UE may determine or calculate PUCCH transmission power through the above-described scheme and transmit PUCCH by using the determined or calculated PUCCH transmission power.

3) Power Control of Sounding Reference Signal

In relation to transmission of sounding reference signal (SRS) at an activated UL BWP of a carrier (f) of a serving cell (c), the UE may calculate a linear power value of the transmission power determined by Equation 5 below. The UE may equally divide the calculated linear power value with respect to the antenna port(s) set for SRS to control the transmission power.

Particularly, in the case that the UE performs SRS transmission in the activated UL BWP (b) of a carrier (f) of a serving cell (c) using SRS power control adjustment state based on index 1, the UE may determine SRS transmission power $P_{SRS,b,f,c}(i, q_s, l)$ (dBm) at SRS transmission occasion (i) based on Equation 5 below.

[Equation 5]

$$P_{SRS,b,f,c}(i, q_s, l) = \min\begin{Bmatrix} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix}$$

[dBm]

In Equation 5, $q_s$ may represent an index for an open-loop power control parameter (e.g., Po, alpha ($\alpha$), DL RS resource for pathloss (PL) measurements (e.g., $PL_{b,f,c}(q_d)$), etc.), and may be set for each SRS resource set. Index 1 may represent an index for a closed-loop power control process, and the index may be set independently from PUSCH or may be set in association. In the case that the SRS power control is not associated with PUSCH, the maximum number of the closed-loop power control processes for SRS may be 1.

Particularly, Po (e.g., $P_{O\_SRS,b,f,c}(q_s)$) may be a parameter broadcasted as a part of system information and represent a target reception power at a receiving side. The Po value may be set in consideration of a throughput of UE, a capacity of cell, a noise and/or interference. Furthermore, alpha (e.g. $\alpha_{SRS,b,f,c}(q_s)$) may represent a ratio of performing compensation for pathloss. The alpha may be set to a value from 0 to 1, and according to the set value, full pathloss compensation or fractional pathloss compensation may be performed. In this case, the alpha value may be set in consideration of interference and/or data rates between the UEs. Furthermore, $P_{CMAX,f,c}(i)$ may represent a set UE transmission power. For example, the set UE transmission power may be interpreted as the 'configured maximum UE output power' defined in 3GPP TS 38.101-1 and/or TS38.101-2. Furthermore, $M_{SRS,b,f,c}(i)$ may represent a bandwidth of SRS resource allocations expressed as the number of resource blocks (RBs) for an SRS transmission occasion based on subcarrier spacing ($\mu$). In addition, $h_{b,f,c}(i,l)$ related to SRS power control adjustment state may be set or indicated based on a TPC command field of DCI (e.g., DCI format 2_3, etc.) received or detected by the UE and/or RRC parameter (e.g., srs-PowerControlAdjustmentStates, etc.).

The resource for SRS transmission may be applied as a reference for determining a beam, a panel, and/or a spatial region transmission filter, and the like by the BS and/or the UE. Considering the point, the SRS transmission power control may be performed in a unit of the beam, panel, and/or spatial domain transmission filter.

The parameters and/or information for SRS power control described above may be individually (i.e., independently) set for each BWP. In this case, the parameters and/or information may be set or indicated through higher layer signaling (e.g., RRC signaling, MAC-CE, etc.) and/or DCI. For example, the parameters and/or information for SRS power control may be transmitted through RRC signaling SRS-Config, SRS-TPC-CommandConfig, and the like, and SRS-Config and SRS-TPC-CommandConfig may be configured as represented in Table 9 below.

TABLE 9

| | |
|---|---|
| SRS-Config ::= | SEQUENCE { |
| srs-ResourceSetToReleaseList | SEQUENCE |
| (SIZE(1..maxNrofSRS-ResourceSets)) OF SRS-ResourceSetId | |
| srs-ResourceSetToAddModList | SEQUENCE |
| (SIZE(1..maxNrofSRS-ResourceSets)) OF SRS-ResourceSet | |
| srs-ResourceToReleaseList | SEQUENCE |
| (SIZE(1..maxNrofSRS-Resources)) OF SRS-ResourceId | |
| srs-ResourceToAddModList | SEQUENCE |
| (SIZE(1..maxNrofSRS-Resources)) OF SRS-Resource | |
| tpc-Accumulation | ENUMERATED {disabled} |
| ... | |
| } | |
| SRS-ResourceSet ::= | SEQUENCE { |
| srs-ResourceSetId | SRS-ResourceSetId, |
| srs-ResourceIdList | SEQUENCE |
| (SIZE(1..maxNrofSRS-ResourcesPerSet)) OF SRS-ResourceId | |
| resourceType | CHOICE { |
| aperiodic | SEQUENCE { |
| aperiodic SRS-ResourceTrigger | INTEGER |
| (1..maxNrofSRS-TriggerStates−1), | |
| csi-RS | NZP-CSI-RS- |
| ResourceId | |
| slotOffset | INTEGER (1..32) |
| ..., | |
| [[ | |
| aperiodicSRS-ResourceTriggerList-v1530 | SEQUENCE |
| (SIZE(1..maxNrofSRS-TriggerStates−2)) | |
| | OF |
| INTEGER (1..maxNrofSRS-TriggerStates−1) | |
| ]] | |
| }, | |

TABLE 9-continued

| | |
|---|---|
| semi-persistent | SEQUENCE { |
|     associatedCSI-RS ResourceId |     NZP-CSI-RS- |
|     ... | |
|     }, | |
|     periodic | SEQUENCE { |
|     associatedCSI-RS ResourceId |     NZP-CSI-RS- |
|     ... | |
|     } | |
| }, | |
| usage | ENUMERATED {beamManagement, codebook, nonCodebook, antennaSwitching}, |
| alpha | Alpha |
| p0 | INTEGER (−202..24) |
| pathlossReferenceRS | CHOICE { |
|     ssb-Index |     SSB-Index, |
|     csi-RS-Index |     NZP-CSI-RS-ResourceId |
| } | |
| srs-PowerControlAdjustmentStates | ENUMERATED { sameAsFci2, separateClosedLoop} |
| ... | |
| } | |
| SRS-TPC-CommandConfig ::= | SEQUENCE { |
|     startingBitOfFormat2-3 |     INTEGER (1..31) |
|     fieldTypeFormat2-3 |     INTEGER (0..1) |
|     ..., | |
|     [[ | |
|     startingBitOfFormat2-3SUL-v1530 |     INTEGER (1..31) |
|     ]] | |
| } | |

The UE may determine or calculate SRS transmission power through the above-described scheme and transmit SRS by using the determined or calculated SRS transmission power.

4) Power Control of Random Access Channel

In the case that the UE performs PRACH transmission in the activated UL BWP (b) of a carrier (f) of a serving cell (c), the UE may determine PRACH transmission power $P_{PRACH,b,f,c}(i)$ (dBm) at PRACH transmission occasion (i) based on Equation 6 below.

$$P_{PRACH,b,f,c}(i) = \min\{P_{CMAX,f,c}(i), P_{PRACH,target,f,c} + PL_{b,f,c}\}$$
[dBm]     [Equation 6]

In Equation 6, $P_{CMAX,f,c}(i)$ may represent a set UE transmission power. For example, the set terminal transmission power may be interpreted as the 'configured maximum UE output power' defined in 3GPP TS 38.101-1 and/or TS38.101-2. Furthermore, $P_{PRACH, target, f,c}$ represents PRACH target reception power provided through higher layer signaling (e.g., RRC signaling, MAC-CE, etc.) for the activated UL BWP. Furthermore, $PL_{b, f, c}$ represents a pathloss for the activated UL BWP and may be determined based on DL RS associated with PRACH transmission at the activated DL BWP. For example, the UE may determine a pathloss associated with PRACH transmission based on SS (Synchronization Signal)/PBCH (Physical Broadcast Channel) blocks associated with PRACH transmission.

The parameters and/or information for PRACH power control described above may be individually (i.e., independently) set for each BWP. In this case, the parameters and/or information may be set or indicated through higher layer signaling (e.g., RRC signaling, MAC-CE, etc.) and/or DCI. For example, the parameters and/or information for PRACH power control may be transmitted through RRC signaling RACH-ConfigGeneric and the like, and RACH-ConfigGeneric may be configured as represented in Table 10 below.

TABLE 10

| | |
|---|---|
| RACH-ConfigGeneric ::= | SEQUENCE { |
|   prach-ConfigurationIndex | INTEGER (0..255), |
|   msg1-FDM | ENUMERATED {one, two, four, eight}, |
|   msg1-FrequencyStart | INTEGER (0..maxNrofPhysicalResourceBlocks−1), |
|   zeroCorrelationZoneConfig | INTEGER(0..15), |
|   preambleReceivedTargetPower | INTEGER (−202..−60), |
|   preambleTransMax | ENUMERATED {n3, n4, n5, n6, n7, n8, n10, n20, n50, n100, n200}, |
|   powerRampingStep | ENUMERATED {dB0, dB2, dB4, dB6}, |
|   ra-ResponseWindow | ENUMERATED {sl1, sl2, sl4, sl8, sl10, sl20, sl40, sl80}, |
|   ... | |
| } | |

The UE may determine or calculate PRACH transmission power through the above-described scheme and transmit PRACH by using the determined or calculated PRACH transmission power.

5) Priority for Transmission Power Control

Hereinafter, a method for controlling transmission power of UE is described, in which the case of a single cell operation in a carrier aggregation situation or a single cell operation in a situation of multiple UL carriers (e.g., two UL carriers) is considered.

In this case, in the case that the total UE transmission power for UL transmissions (e.g., PUSCH, PUCCH, SRS, and/or PRACH transmissions in 1) to 4) described above) in each transmission occasion (i) exceeds a linear value (e.g., $\hat{P}_{CMAX}(i)$) of the UE transmission power, the UE may configured to allocate power for the UL transmissions according to a priority order. In one example, the configured UE transmission power may mean the 'configured maximum UE output power' (e.g., $P_{CMAX}(i)$ defined in 3GPP TS 38.101-1 and/or TS38.101-2.

In this case, the priority for transmission power control may be configured or defined in the following order.

PRACH transmission in PCell (Primary Cell)

PUCCH for HARQ-ACK (Hybrid Automatic Repeat and reQuest-Acknowledgement) information and/or SR (Scheduling Request), or PUSCH for HARQ-ACK information PUCCH or PUSCH for CSI (Channel State Information)

PUSCH for HARQ-ACK information or not for CSI

SRS transmission (however, aperiodic SRS has a priority higher than semi-persistent SRS and/or periodic SRS) or PRACH transmission at a serving cell, which is not PCell Through the power allocation based on a priority order described above, the UE may control total transmission power at each of the symbols of transmission occasion (i) is equal to or smaller than a linear value of the configured UE transmission power. In one example, for this, the UE may be configured to scale and/or drop power for an uplink transmission having a lower priority. In this case, detailed factors for scaling an/or dropping may be configured or defined to follow a UE implementation.

In addition, as a specific example, in the case of transmissions having the same priority in a carrier aggregation, the UE may consider transmission in PCell as a higher priority than transmission in SCell. And/or, in the case of transmissions having the same priority in multiple UL carriers (e.g., two UL carriers), the UE may consider the carrier on which PUCCH transmission is set as a higher priority. Furthermore, in the case that PUCCH transmission is not set in any carrier, the UE may consider transmission in non-supplementary UL carrier as a higher priority.

6) Transmission Power Control Procedure

FIG. 10 illustrates an example of a procedure for controlling UL transmission power to which the method proposed in the present disclosure is applicable.

First, a User Equipment (UE) may receive parameter and/or information related to transmission power (Tx power) from a base station (BS) (step S1010). In this case, the UE may receive the parameter and/or information through higher layer signaling (e.g., RRC signaling, MAC-CE, etc.). In one example, in relation to PUSCH transmission, PUCCH transmission, SRS transmission, and/or PRACH transmission, the UE may receive the parameter and/or information (e.g., Table 7, Table 8, Table 9, Table 10, etc.) related to the transmission power control described in 1) to 4) above.

Thereafter, the UE may receive TPC command in relation to the transmission power from the BS (step S1020). In this case, the UE may receive the TPC command through lower layer signaling (e.g., DCI). In one example, in relation to PUSCH transmission, PUCCH transmission, and/or SRS transmission, the UE may receive information for the TPC command to be used to determine power control adjustment state through a TPC command field of a predefined DCI format as described in 1) to 3) above. However, for PRACH transmission case, the corresponding step may be omitted.

Thereafter, the UE may determine (or calculate) transmission power for a UL transmission based on parameter, information, and/or TPC command received from the BS (step S1030). In one example, the UE may determine PUSCH transmission power, PUCCH transmission power, SRS transmission power, and/or PRACH transmission power based on the scheme (e.g., Equation 3, Equation 4, Equation 5, Equation 6, etc.) described in 1) to 4) above. And/or, in the case that two or more UL channels and/or signals are required to be transmitted in overlapped manner, like a situation as carrier aggregation, the UE may determine transmission power for a UL transmission considering priority order in 5) described above.

Thereafter, the UE may perform transmission of one or more UL channels and/or signals (e.g., PUSCH, PUCCH, SRS, PRACH, etc.) for the BS (step S1040).

The foregoing description (e.g., 3GPP system, frame structure, NR system) may be applied in combination with the methods proposed in the disclosure or may be added up to clarify the technical characteristics of the methods proposed in the disclosure. Further, the embodiments and/or methods described in the disclosure are differentiated solely for ease of description, and some components in any one method may be replaced, or combined with components of another method.

In the implementation of a UE in a high frequency band, modeling of a UE having a plurality of panels consisting of one or a plurality of antennas is being considered (e.g., bi-directional two panels in 3GPP UE antenna modeling). Various forms may be considered in implementing such a multi-panel. This is described below in detail with reference to FIGS. 10 and 11.

FIG. 11 and FIG. 12 illustrate an example of multi-panel based on an RF switch applied to the disclosure.

A plurality of panels may be implemented based on an RF switch.

Referring to FIG. 11, only one panel may be activated at a time, and signal transmission may be impossible for a predetermined time during which the activated panel is changed (i.e., panel switching).

FIG. 12 illustrates a plurality of panels according to different implementation schemes. Each panel may have an RF chain connected thereto so that it may be activated at any time. In this case, the time taken for panel switching may be zero or very short, and depending on the modem and power amplifier configuration, multiple panels may be simultaneously activated to transmit signals simultaneously (STxMP: simultaneous transmission across multi-panel).

In a UE having a plurality of panels described above, the radio channel state may be different for each panel, and the RF/antenna configuration may be different for each panel. Therefore, a method for estimating a channel for each panel is required. In particular, 1) to measure uplink quality or manage uplink beams or 2) to measure downlink quality for each panel or manage downlink beams using channel reciprocity, the following procedure is required.

A procedure for transmitting one or a plurality of SRS resources for each panel (here, the plurality of SRS resources may be SRS resources transmitted on different beams within one panel or SRS resources repeatedly transmitted on the same beam).

For convenience of description below, a set of SRS resources transmitted based on the same usage and the same time domain behavior in the same panel is referred to as an SRS resource group. The usage may include at least one of beam management, antenna switching, codebook-based PUSCH, or non-codebook based PUSCH. The time-domain behavior may be an operation based on any one of aperiodic, semi-persistent, and periodic.

The SRS resource group may use the configuration for the SRS resource set supported in the Rel-15 NR system, as it is, or separately from the SRS resource set, one or more SRS resources (based on the same usage and time-domain behavior) may be configured as the SRS resource group. In relation to the same usage and time-domain behavior, in the case of Rel-15, a plurality of SRS resource sets may be configured only when the corresponding usage is beam management. It is defined that simultaneous transmission is impossible between SRS resources configured in the same SRS resource set, but simultaneous transmission is possible between the SRS resources belonging to different SRS resource sets.

When considering the panel implementation scheme and multi-panel simultaneous transmission as shown in FIG. 12, the concept described above in connection with the SRS resource set may be directly applied to the SRS resource group. When considering panel switching according to the panel implementation scheme according to FIG. 11, an SRS resource group may be defined separately from the SRS resource set.

For example, a specific ID may be assigned to each SRS resource so that the resources with the same ID belong to the same SRS resource group, and resources with different IDs belong to different resource groups. The term 'panel' as used in the disclosure may be variously interpreted as a 'group of UE antenna elements', 'group of UE antenna ports', or 'group of logical UE antennas'. Various schemes may be taken into account as to what physical/logical antennas or antenna ports are to be tied up and mapped to one panel, given the position/distance/correlation between antennas, the RF configuration, and/or the antenna (port) virtualization scheme. The mapping process may vary depending on the implementation of the UE. Further, as used herein, "panel" may be changed to and interpreted/applied as a "plurality of panels" or a "panel group" (having similarity in a specific characteristic aspect). The following two schemes may be considered to support the above process.

[SRS Configuration Scheme 1]

The base station may configure a plurality of SRS resource groups through a higher layer message. Accordingly, the UE may map different SRS resource groups to different panel(s).

For example, if the base station configures SRS resource group #0 and SRS resource group #1 with RRC, a two panel UE may map each panel to each SRS resource group and transmits SRS from the corresponding panel based on an SRS triggering command of the base station.

Here, 'two SRS resource groups (#0, #1) are configured' may mean that, for a plurality of SRSs having the same usage (antenna switching, beam management, etc.) and the same time-domain behavior (aperiodic, semi-persistent, or periodic), each separate SRS resource group (or SRS resource set) is configured.

According to an embodiment, the UE may report capability information regarding how many SRS resource groups are required for the same usage and the same time-domain behavior to the base station. According to an embodiment, the UE may report capability information regarding how many UL Tx panels are mounted to the base station.

If the base station configures one or a plurality of SRS resource groups to the corresponding UE based on the reported capability information as described above, the mapping between the SRS resource group and the UE's panel may be performed as follows.

For example, based on the implementation of the UE, the corresponding UE may freely map each SRS resource group to the UE panel (or UE panel group).

As another example, the panel (or panel group) to which each SRS resource group is to be mapped may be indicated as the base station assigns an explicit or implicit ID corresponding to each panel (group) to each group.

As another example, the mapping between the SRS resource group and the UE panel (or panel group) may be implicitly designated based on "other characteristics" that are configured differently for each SRS resource group.

As an example of the 'other characteristics', uplink power control (UL power control) may be considered. For example, all or some of uplink power control parameters (e.g., DL RS for pathloss), closed-loop power control parameters (closed-loop power control parameter), and the maximum transmission power (Pc_max) may be configured/designated to differ. Alternatively, an uplink power control process ID (UL power control process ID) may be separately configured for each SRS resource group. The UE may map a panel (or panel group) based on information configured for each SRS resource group.

Specifically, e.g., the maximum transmit power (Pc_max) is different for each panel (or panel group), and related information may be transferred to the base station. The base station may configure a Pc_max value to be applied to each SRS resource group based on the corresponding information. The UE may map a panel (panel group) according to the Pc_max value configured in each SRS resource group.

As another example of the 'other characteristics', uplink timing advance (UL timing advance (TA)) may be considered. In other words, a TA value to be applied during transmission in units of SRS resource groups may be configured/designated differently. For example, the UE may obtain a TA value to be applied to each panel (or panel group) after performing a specific PRACH preamble/occasion or random access procedure (RACH procedure) using each panel (or panel group). If it is separately set which TA value (or the value corresponding to which RACH process) to be applied for each SRS resource group, the corresponding SRS resource group may be transmitted using the panel (or panel group) having transmitted the PRACH.

As another example of the 'other characteristics', the number of antenna ports per panel (or panel group) may be considered. For example, if the UE reports the number of antenna ports required for each panel (or panel group) or each SRS resource group as 2 and 4 differently, mapping between the panel and the SRS resource group may be implicitly performed according to the total number of antenna ports configured for SRS resources belonging to each SRS resource group.

[SRS Configuration Scheme 2]

The base station may configure one (or a plurality of) SRS resource group to the UE through a higher layer message and may indicate, to the UE, the panel (or panel group) to transmit the corresponding SRS resource group through a lower layer message.

Example 1) The base station may configure SRS resource group #0 through an RRC message and may indicate panel #0 through MAC-CE and/or DCI. A two panel UE may transmit SRS in the first panel and, if panel #1 is indicated with MAC-CE and/or DCI, transmits SRS through the second panel.

Example 2) The base station may configure SRS resource group #0 and SRS resource group #1 through the RRC message and may indicate {panel #0, panel #1} through MAC-CE and/or DCI. The UE transmits SRS in resources corresponding to SRS resource group #0 and SRS resource group #1 through the first panel (panel #0) and the second panel (panel #1). If the base station indicates {panel #1, panel #2} to the UE through MAC-CE and/or DCI, the UE transmits the corresponding SRS through the second panel (panel #1) and the third panel (panel #2).

Further, the above-described SRS configuration schemes 1 and 2 may be likewise applied to other UL signals/channels, e.g., PUCCH, PRACH, or PUSCH, as well as SRS. In this case, SRS configuration scheme 1 may be expanded/replaced with UL (e.g., PUCCH, PRACH, PUSCH, etc.) configuration scheme 1, and SRS configuration scheme 2 may be expanded/replaced with UL (e.g., PUCCH, PRACH, PUSCH, etc.) configuration scheme 2. In other words, an uplink resource group (UL resource group) to be applied in the same panel may be configured through a higher layer message (e.g., RRC signaling, MAC-CE, etc.).

The SRS configuration scheme 2 is a scheme in which a plurality of panels may share the same SRS resource group, and since the signaling overhead through a higher layer message is less than that of scheme 1, it is a scheme more suitable for UEs which perform uplink transmission using only one panel at one moment, but inappropriate for UEs in which simultaneous transmission across multi-panel (STxMP) is supported. Conversely, scheme 1 may have a greater signaling burden for SRS configuration but has the advantage of supporting various UE implementations, particularly UEs supporting STxMP.

In a UE panel implementation, a power amplifier (PA) may also be implemented in various forms. For example, a two panel UE, which may transmit up to 23 dBm, may be implemented in the following form. In one example, the UE may be implemented to transmit up to 20 dBm for each panel (considering STxMP). In another example, the UE may be implemented to transmit up to 23 dBm for each panel (considering panel selection only). In still another example, the UE may be implemented to transmit up to 20 dBm for one part of panel and up to 23 dBM for another part of panel. Otherwise, the UE may be implemented in various schemes. Even in the case that the UE has good PA, the UE is designed such that maximum transmission power is limited to a specific value in accordance with the regulation considering influence on a human body in a wireless communication system. This is referred to as Pc_max parameter. The Pc_max parameter may be separately defined/configured for each cell/BWP/carrier considering the carrier aggregation (CA) case. In a multiple antenna situation, transmission of dividing power for each antenna is considered, but the Pc_max is managed in the entire antenna aspect. Even for a multiple panel UE, the following two methods may be considered in relation to the Pc_max.

Method 1) Pc_max is separately defined/configured for each panel

Method 2) Pc_max is defined/configured for the entire panel

Considering STxMP, according to method 2, the power control principle in the aspect of a current multiple antenna transmission is maintained. Considering a method of transmission using a single panel at once, method 1 may be more proper considering a difference of PA configuration for each panel. Even in the case that method 1 is applied, a power limit is required in the aspect of the entire transmission as described above.

Accordingly, hereinafter, in the present disclosure, methods are proposed for controlling the entire panel maximum transmission power together with the maximum transmission power for each panel. Hereinafter, the maximum value of a summation of transmission power to be applied to the entire UE panels (in a specific carrier/cell/BWP) is referred to as Pc_max_common. The term is for the convenience of description, and not to limit the technical scope.

The methods described below are distinguished only for the convenience of description, and it is understood that a part of component of a method may be replaced by a part of component of another method or may be combined with a part of component of another method.

[Proposal 1]

Independent power control formular is applied to each panel (or UL resource (group), and min (Pc_max_common*w_n, formular_n) is applied to each panel (i.e., UL resource (group)), respectively (herein, n corresponds to a panel index or UL resource group index).

w_n may be a coefficient based on at least one of Example 1 to Example 4 below. However, w_n is not limited thereto, and w_n may be changed depending on a UE implementation scheme.

Example 1) w_n=1 for n=0, . . . N−1
Example 2) w_n=1/N for n=0, . . . N−1
Example 3) w_n for n=0, . . . N−1 are configured by gNB (e.g., RRC signaling, MAC-CE, DCI, etc.)
Example 4) w_n for n=0, . . . N−1 are reported by UE (e.g., UE capability)

A part or all the examples above may be limitedly applied only to cases except the case in which UL resources belonged to different UL resource groups are transmitted in the same symbol (or symbol set), and in the case that UL resources are transmitted in the same symbol (set), each panel transmission power may be scaled down according to a specific rule (including the case that transmission power of a specific panel becomes 0).

Example 3 and Example 4 may be applied together. That is, when a UE report a w_n value, a BS may set w_n value based on (or referring to) the value.

In this case, the formular_n may be different for each UL channel/signal. The existing formulae described in the UL power control described above may be identically applied or applied with being partially modified.

For example, formular_n for PUSCH PC may mean the formular such as "$P_{O\_PUSCH,b,f,c}(j) + 10 \log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l)$" for panel n.

For another example, in the case that Pc_max value for the panel is separately defined/regulated/configured such as Pc_max_panel, formular_n for PUSCH PC may mean the formular such as "$P_{O\_PUSCH,b,f,c}(j) + 10 \log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l)$".

The advantage of Example 1 is that maximum power may be used even in the case that a specific panel is used. However, as described above, since the PA structure for each panel may be different, whether the scheme is applied may be determined by a UE capability. In addition, according to Example 1, when a specific UL signal is transmitted to a specific panel, the specific UL signal may be transmitted with full power. However, since it is hard to apply Example 1 to a UL signal (e.g., PUSCH) to which STxMP is applied, coverage mismatch may occur according to a type of UL signal/channel.

Since Example 2 assumes that the maximum power per channel is uniformly decreased, most of UL implementation schemes may support Example 2, and accordingly, there is an advantage that Example 2 may be commonly used (regardless of a UE capability) (i.e., regulated as a default operation). However, in the case of the transmission based on panel-selection/switching, since transmission with full power may be impossible, UL coverage may be reduced.

Example 3 and Example 4 may supplement/compensate the advantages and disadvantages.

Example 4 is a scheme that if a UE provides information for maximum power for each panel to a BS, the BS uses the value without any change.

Example 3 is a scheme that a BS configures w_n to meet the factors (e.g., UL interference/coverage) which is considered according to a requirement of the BS. Particularly, according to Example 3, the BS may set w_n of a specific panel to 0 (or a value approximate to 0 (or a specific set value (e.g., void, NULL)) not to perform transmission in the corresponding panel. The state in which N panels are activated is mainly assumed in other examples, but since the number N of activated panels and the panel combination may be instantaneously changed, in accordance with this, the range of n and N value may be changed (e.g., the range of n and N value is set/changed through RRC and/or MAC-CE by the BS).

[Proposal 1-1]

In Proposal 1, in the case that a total summation (P_tot) from formular_0 to formular_(N-1) is greater than Pc_max_common, a UE may perform one of the following operations.

Method 1-1A) A UE performs power scaling with P_n=formular_n*α_n for n=0, . . . , N-1, respectively, and applies P_n instead of formular_n for each n-th panel (or UL resource (group)). Here, a n is a scaling coefficient (positive number) for the n-th panel (or UL resource (group)) and may be determined according to a predefined priority or a priority set by a BS. Alternatively, α_n may be based on a fixed value such as α_n=Pc_max_common/P_tot for all n. Herein, α_n, n, and N values may be designed to satisfy the constraint that the total summation from P_0 to P_(N-1) becomes Pc_max_common or smaller.

Method 1-1B) A UE may power down as much as P_nx=max(P_min, formular_nx-P_down_x), for x=0, . . . , X-1 for X panel(s) (or UL resource (group)(s)) n0, . . . , n(X-1) according to a priority predefined or set by a BS and apply P_nx instead of formular_nx. Herein, P_min means panel minimum transmission power (e.g., P_min=0), and the total summation from P_down_0 to P_down_(X-1) may be equal to or smaller than P_tot-Pc_max_common. In addition, x may mean an index of panel (or UL resource (group)) to power down.

Example 1) X=1, P_down_0=P_tot-Pc_max_common

Example 2) P_down_x=formular_nx

Example 3) P_down_x=(P_tot-Pc_max_common)*β_x for x=0, . . . , X-1, herein β_x may be a weight value (positive value) for nx-th panel (or UL resource (group)) and may be determined according to a priority predefined or set by a BS. In another example, β_x may be based on a fixed value such as β_x=1/X for all x. The total summation of β_x may be 1.

Proposal 1-1 includes embodiments such that the total summation of transmission power of each panel does not exceed Pc_max_common.

Method 1-1A above is a method such that the total summation of transmission power of each panel does not exceed Pc_max_common by normalizing formular_n by total power amount.

Method 1-1B is a method such that the total summation of transmission power of each panel does not exceed Pc_max_common by reducing transmission power of a specific panel(s). In Method 1-1B, the number X of panels to perform power adjustment may be based on a specific regulated value (according to the total number of activated panels N) or based on a value set by a BS. In another example, X may be a value determined according to the total number of activated panels N, Pc_max_common, Pc_max for each panel, P_tot, and/or (instantaneous) transmission power of each panel. In one example, in order to minimize the number of panels of performing power down, X may be regulated/configured to find the smallest value that makes P_tot(X)-Pc_max_common become a negative number, and the value is applied to X. Herein, P_tot(X) means P_tot value of the case of performing power down for a total of X panels.

Example 1 of Method 1-1B) is a method of decreasing an exceeding power amount (P_tot-Pc_max_common) for a specific panel when the total summation of panel transmission power exceeds Pc_max_common.

Example 2 of Method 1-1B) is a method of controlling to transmit minimum power (P_min) only for all X panels (or not to transmit or turn of the panels) when the total summation of panel transmission power exceeds Pc_max_common.

Example 3 of Method 1-1B) is a method of deducting as much as weight (β_x) which is determined for the power amount exceeding for specific X panels when the total summation of panel transmission power exceeds Pc_max_common by further generalizing Example 1. According to Example 1, since the power excess is deducted only for a specific panel (having the lowest priority), there is an advantage that power of the remaining panels (having a higher priority) may not be lowered. However, in the case that the power excess is significantly great, the UL coverage of a specific panel may be excessively reduced, and in the case that the power excess exceeds formular_n0, the entire power may exceed Pc_max_common even though the power of the panel is turned off. In relation to this, Example 3 has an advantage that the disadvantages described above may be compensated by further expanding Example 1, but in the case that the power excess is significantly great, a method of obtaining β_x and X values may become complex.

Example 2 is a method of turning off specific X panels simultaneously, and since the determination of X value is simple and transmission is not performed in the panels, the coverage issue may not occur. However, in the case that power excess is small, the transmission power may become excessively lowered.

In Proposal 1-1, the method of calculating P_tot may be changed to a weighted summation for each formula (e.g., P_tot=formular1*1.2+formular2*0.8), and each weight is indicated by directly or indirectly (the weight included in a predefined table is indicated through an index in the table) through RRC by a BS.

Method 1-1A and Method 1-1B are applied to the case in which P_tot is greater than Pc_max_common. However, the present disclosure is not limited thereto, and Method 1-1A and Method 1-1B may be applied regardless of the condition where P_tot exceeds Pc_max_common. In one example, Method 1-1A and Method 1-1B may be applied to reduce power of a UE or reduce UL interference of a BS.

In the proposed methods above, a UL resource group may be interpreted as a set of SRS resources (transmitted in the same panel or mapped to the same panel ID), a set of PUCCH resources, a set of PRACH resources/sequences/occasions) and applied. In the case that a UE transmits a specific UL signal (e.g., PUSCH) via a plurality of panels alternately (repeatedly), the transmission occasion or sequence of the signal may be mapped to each panel implicitly and applied. For example, in the case of transmitting the same PUSCH repeatedly throughout several slots for URLLC use case, in Proposal 1/Proposal 1-1, the panel index n may be interpreted as n-th PUSCH (occasion or slot) and applied. Alternatively, in the case that a plurality of ports/layers that configures the same UL channel is present, a UE may UL signals alternately by dividing panels for each port group or layer group. In such a case, the proposed power control method may be applied in a unit of port group or a unit of layer group that configures the same UL physical channel.

The proposed methods are assuming the case in which UL resource/occasion/sequence/layer group to transmit for each panel is separated. However, considering only the operation based on panel switching, like SRS configuration method 2 described above, the method of changing only the panel ID to be applied to the same UL resource implicitly or explicitly (by MAC-CE, etc.) is also available.

That is, while a plurality of panels shares a configuration for a UL RS/channel configured through higher layer signaling, a method for changing a transmission panel by lower layer signaling (e.g., MAC-CE and/or DCI) according to a transmission timing may be considered. In this case, a transmission panel may be instantaneously changed for the same UL RS/resource. Considering a difference of DL RS for pathloss estimation occurred due to a difference of PA configuration for each panel, an optimal TRP for each UE panel, a TRP beam, or a difference of TRP panel, it is preferable that the power control formulae to be applied to the same UL RS/channel are changed with being linked with a channel ID.

For this case, the following method (hereinafter, Proposal 2) is proposed. Here, a panel ID includes the case in which a transmission panel is implicitly indicated by utilizing a predefined ID such as SRS resource set ID or using reference RS information included in spatial relation information as well as the case in which a panel-specific ID is explicitly present.

[Proposal 2]

In the case that a transmission panel is changed implicitly or explicitly with respect to a specific UL signal/channel, a UE may operate according to one of the following methods.

Method 2A) In relation to an application of each parameter value included in a power control parameter set, the UE may operate according to one of 1) to 4) below.

1) Each of the parameter values is maintained as the same value as before the change.

2) Each of the parameter values is changed to a default value defined by a separate configuration or rule.

3) Each of the parameter values is changed to a value indicated/configured by a BS (together with a panel change message).

4) A value of each of the parameter values is reset.

The power control parameter set (P_c parameter set) may include at least one power control parameter among P0, alpha, DL RS for path-loss, or Closed-loop PC) (e.g., selection between 1_0 and 1_1)).

According to an embodiment, in the case that the BS indicates DL RS and/or CLPC (Closed-loop PC) with a panel change message (e.g., via MAC-CE), the UE may be configured to maintain the previous value for the remaining power control parameters (not included in the indication), apply the default value defined by a separate configuration or rule, or reset CLPC (+DLRS for PL) only (e.g., if CL PC is 1_0, CLPC loop 1_0 is maintained but reset to 0). As an example of the default parameter configuration, SSB/CSI-RS selected for PRACH transmission (for initial access) may be set as DL RS for PL estimation.

Method 2B) The BS may be configured to preset power control parameter set (P_c parameter set) to the UE for each Tx panel (group) (via RRC), and the UE may be configured to apply the power control parameter set (P_c parameter set) that corresponds to the changed Tx panel (group) by the panel change message.

Method 2A is a method of maintaining a part of the power control parameter set (P_c parameter set) for the UL RS/channel as the same value as before the change and changing or resetting the remaining the power control parameter set when the panel is changed. Method 2B is a method of configuring the power control parameter set (P_c parameter set) separately by RRC in preparation of a panel change. Method 2B is a method of extendedly applying the approach which was applied according to a spatial relation for PUCCH in Rel-15 to a plurality of panels.

Additionally, in the case that a channel change is frequent, or UE mobility is low, the reuse of a part or the whole power control parameters which were used in the panel in an activated state previously may be more efficient than the restart of power control again or the application of the power control parameters which were used in other panel without any change.

As described in Method 2A/2B of Proposal 2 above, the method of storing a power control parameter set (or a part of the power control parameter set) which has been applied in the existing activated state and applying the stored power control parameter set in re-activation of the panel may be applied limitedly to the case that the panel is reactivated within a specific time (before a time according to a specific threshold elapses). In the case that the panel is reactivated after the specific time (after the time according to a specific threshold elapses), it may not be preferable to apply the power control parameter which was previously stored/applied without any change. The "specific time (specific threshold)" value may be based on a specific regulated (or promised) value (according to a subcarrier spacing, a UE power class, etc.) or based on a value set by the BS (considering a UE mobility, etc.).

In consideration of the point, the following method (hereinafter, Proposal 3) is proposed.

[Proposal 3]

In the case that (for a specific UE type or by a BS configuration) a panel for transmitting a specific UL signal/channel is reactivated (within a specific time), a part or the whole power control parameters may be resumed from the power control parameters which were indicated/maintained/configured in the state in which the panel is activated most recently.

In applying the method, additionally, for a part of the power control parameters, (according to a BS configuration/instruction) the power control parameter used for the panel before the change may be maintained (e.g., P0, alpha, DL RS for PL).

Example 1) As described in Method 2A of Proposal 2, in the case that only one parameter set is maintained, the power control parameter stored in the latest activation time (for the panel) is used for the reactivated panel (within a specific time).

In the case that the panel is reactivated after a specific time elapses, the UE expects that a new power control parameter is indicated. Alternatively, the UE may apply a preconfigured or predefined default power control parameter set.

Example 2) As described in Method 2A of Proposal 2, in the case that power control parameters are set for each panel, the UE applies the power control parameter set corresponding to an activated panel but resumes (CLPC value) (in the case that the panel is reactivated within a specific time).

In the case that the panel is reactivated after a specific time elapses, the UE may reset CLPC value only but apply a preconfigured value for the remaining power control parameters.

For a UL power control, a process for a UE to report a power budget of a current state to a BS is regulated as a power headroom report (PHR) process [TS38.321, TS38.331]. As proposed above, in the case that power control is performed for each panel, it is preferable that the power headroom report (PHR) is also performed for each panel. Accordingly, in the present disclosure, a UE that support the multiple-panel may be configured to report the power headroom as described in the following methods (hereinafter, Proposals 4 and 5).

[Proposal 4]

A UE may report the power headroom separately for each panel. In this case, in order to reduce feedback information amount, the UE may report a differential value based on the power headroom for a specific panel with respect to the power headroom values for the remaining panels.

[Proposal 5]

After a UE calculates a power headroom for each UE panel separately, the UE transmit a representative power headroom value to a BS. In this case, the representative power headroom value may be determined based on a specific function with power headroom values for each panel as a factor (e.g., minimum value of the power headroom values, average values of the power headroom values, or maximum value of the power headroom values).

In Proposals 4 and 5, the 'panels' which are targets of power headroom calculation or report may be limited to the panels in the activated state (and/or panels which were in activated state before a specific time at the latest).

When Proposals 4 and 5 are applied, a plurality of power headroom reports (PHRs) (as many as the number of panels (or panel groups)) may be supported for the same carrier. In NR system, whether the multiple PHR is applied to the UE may be configured through PHR-Config configured by RRC. Presently, the multiple PHR is supported only in the dual connectivity environment or the UL aggregation environment. In the case that the present technique is applied, the multiple PHR may be supported eve in the single component carrier environment. In calculation of the power headroom for each panel, Pc_max_panel for each panel may be applied, and for this, the process for a UE to report Pc_max_panel for each panel to a BS (as UE capability) and/or the process for a BS to set Pc_max_panel for each panel to a UE may be preceded.

As described above, it is understood that the "for each panel" may be expressed by "for each specific ID" in a standard document. As an example of the ID, SRS resource group ID, panel ID, antenna port group ID, power control related process/parameter (set) ID, and the like may be considered.

In an implementational aspect, the operation of BS/UE according to the embodiments (e.g., operation in relation to UL signal transmission based on at least one of configuration method 1, configuration method 2, and Proposal 1 to Proposal 5) may be processed by the apparatus (e.g., processor 102 or 202 of FIG. 16) shown in FIG. 16 to FIG. 20 to be described below.

In addition, the operation of BS/UE according to the embodiments (e.g., operation in relation to UL signal transmission based on at least one of configuration method 1, configuration method 2, and Proposal 1 to Proposal 5) may be stored in a memory (e.g., memory 104 or 204 of FIG. 16) in a command/program form (e.g., instruction, executable code, etc.) for driving at least one processor (e.g., processor 102 or 202 of FIG. 16).

Hereinafter, with reference to FIG. 13, the embodiments described above are described in detail in the aspect of signaling between a UE and a BS.

FIG. 13 is a flowchart for describing a multiple-panel based UL transmission and reception signaling procedure to which the method proposed in the present disclosure is applicable. FIG. 13 is just for the convenience of description and does not limit the scope of the present disclosure.

Referring to FIG. 13, a case is assumed that a UE and/or a BS support(s) a multiple-panel based signal/channel transmission and reception. In addition, a certain step among the steps shown in FIG. 13 may be omitted considering UE/BS implementation and/or a predefined rule.

The UE may report UE capability information related to the multiple-panel based signal/channel transmission and reception to the BS (through higher layer signaling, etc.) (step S1310). In one example, as described above (e.g., in relation to SRS configuration methods 1 and 2, Proposal 1, etc.), the UE capability information may be the number of UL resource groups (e.g., SRS/PUCCH/PUSCH/PRACH resource/occasion/sequence/layer group, etc.) supported by the UE and/or the number of (UL Tx) panels supported by the UE.

The UE may receive a configuration (i.e., UL transmission related configuration) related to a UL transmission from the BS (step S1320). Here, the configuration may include information for a configuration for the UL resource group described above, and/or a configuration related to a panel, and/or configuration/mapping relation between a UL resource group and a panel. The configuration may be forwarded through higher layer signaling (e.g., RRC signaling, etc.).

As a specific example, like in SRS configuration methods 1/2 described above and/or Proposals 1 to 5 described above, the configuration may include at least one of information for SRS resource group, information related to a panel, or information for a mapping relation between the SRS resource group and the panel. In this case, the configuration may also include information (e.g., parameter (set)) related to power control for each SRS resource group/panel (e.g., the parameter (set) mentioned in Proposals 1 to 3 descried above, etc.).

As another specific example, in the case that SRS configuration methods 1 and 2 described above and/or Proposals 1 to 5 described above are extended to other UL signal/channel (e.g., PUCCH, PUSCH, PRACH, etc.), the configuration may include at least one of information for a UL resource group, information related to a panel, or a mapping relation between the UL resource group and the panel. Here, the mapping relation may be an explicit mapping relation between the UL resource group and the panel or an implicit mapping relation in a medium of SRS resource group. In this case, the configuration may include information (e.g., parameter (set)) related to power control for each UL resource group/panel.

In this case, as described above, a panel switching (or panel re-activation, etc.) operation may be performed between the UE and the BS (step S1330). In this case, the UL resource group/panel to be applied to a UL transmission by the UE may be changed/reset, or the parameter (set) to be applied for power control may be changed/reset. For example, like Proposal 2 and/or Proposal 3 described above, in the case that a panel switching/re-activation is performed, the UE may be configured to reinterpret the parameter (set) related to power control by comparing the parameter (set) with that of previously configured.

The UE may determine a panel(s) to perform a UL transmission based on the received configuration (step S1340). For example, like in SRS configuration methods 1/2 described above and/or Proposals 1 to 5 described above, the UE may determine a panel to perform a UL transmission by using a mapping relation between UL resource group unit and a panel.

As a specific example, in the case of aperiodic SRS, the UE may determine a panel to perform SRS transmission through SRS resource group indicated through triggering DCI among a configured SRS resource group(s). Alternatively, in the case of periodic/semi-persistent SRS, a configured SRS resource group(s) itself is associated with a panel, and the UE may determine a panel to perform SRS transmission based on the mapping relation mentioned in step S1320.

The UE may calculate UL transmission power (UL Tx power) based on the configuration (and/or indication) which is configured from the BS in the previous step (step S1350). In one example, the UE may perform power control based on the UL power control content descried above. As a specific example, in relation to a multiple-panel based UL transmission (e.g., SRS, PUCCH, PUSCH, PRACH, etc.), the UE may perform UL transmission power control (UL Tx power control) based on the methods described in Proposals 1 to 3 described above. In relation to this, the UE may report information for power headroom to the BS as described in Proposals 4 and 5 above. Here, the UE may be configured/instructed to perform PHR through MAC-CE by the BS.

The UE may perform a multiple-panel based UL transmission for the BS based on the UL Tx power determined through the processes described above (step S1360).

In relation to this, the operation of the BS and/or the UE may be implemented by the apparatus to be described below (e.g., FIG. 16 to FIG. 20). For example, the BS may correspond to a transmission apparatus, and the UE may correspond to a reception apparatus. In some cases, the opposite case may be considered.

Particularly, referring to FIG. 17, at least one processor 102 of the UE 100 may control to transmit/receive a signal/channel (e.g., configuration, indication, UE capability, SRS/PUCCH/PUSCH/PRACH, etc.) through at least one transceiver 106 and control to perform decoding/encoding for a signal/channel. In this process, the UE 100 may use at least one memory 104 and store the decoded/encoded data in at least one memory 104. At least one processor 202 of the BS 200 may control to transmit/receive a signal/channel (e.g., configuration, indication, UE capability, SRS/PUCCH/PUSCH/PRACH, etc.) through at least one transceiver 206 and control to perform decoding/encoding for a signal/channel. In this process, the BS 200 may use at least one memory 204 and store the decoded/encoded data in at least one memory 204.

Hereinafter, the embodiments described above are described in detail in the aspect of a UE operation with reference to FIG. 14. The methods described below are distinguished only for the convenience of description, and it is understood that a part of component of a method may be replaced by a part of component of another method or may be combined with a part of component of another method.

FIG. 14 is a flowchart for describing a method for a UE to transmit a UL signal in a wireless communication system according to an embodiment of the present disclosure.

Referring to FIG. 14, a method for a UE to transmit a UL signal in a wireless communication system according to an embodiment of the present disclosure includes a step of receiving configuration information in relation to transmission power (step S1410), a step of determining the transmission power based on the configuration information (step S1420), and a step of transmitting the UL signal based on the determined transmission power (step S1430).

In step S1410, the UE receives configuration information in relation to transmission power of the UL signal from the BS.

According to an embodiment, the configuration information may include parameters related to the determination of the transmission power. The parameters may include at least one parameter included in the power control parameter set (P_c parameter set).

According to an embodiment, based on a change of the panel for transmitting the UL signal, a value of the parameters may be maintained as a same value before the change of the panel or may be changed to a value set to default.

According to step S1410 described above, the operation of the UE (100/200 shown in FIG. 16 to FIG. 20) to receive configuration information in relation to transmission power of the UL signal from the BS (100/200 shown in FIG. 16 to FIG. 20) may be implemented by the apparatus shown in FIG. 16 to FIG. 20. For example, referring to FIG. 17, one or more processors 102 may control one or more transceivers 106 and/or one or more memories 104 to receive configuration information in relation to transmission power of the UL signal.

In step S1420, the UE determines the transmission power based on the configuration information.

According to an embodiment, the transmission power may be determined for each panel of a plurality of panels of the UE. The transmission power may be determined to be a smaller value between a first transmission power and a second transmission power. In this case, the determination of the transmission power may be based on Proposal 1 described above.

According to an embodiment, the first transmission power may be based on a maximum value of a summation of transmission power of each of the plurality of panels. The maximum value may be Pc_max_common of Proposal 1 described above. The second transmission power may be a precalculated transmission power based on an index of each of the panels. The second transmission power may be based on formular_n of Proposal 1 described above.

According to an embodiment, the first transmission power may be based on the maximum value and a predetermined coefficient for each of the panels. The predetermined coefficient for each of the panels may be w_n of Proposal 1 described above.

In one example, the predetermined coefficient may be 1 or an inverse value of the number of activated panels of the plurality of panels. In another example, the predetermined coefficient may be configured based on information configured by the BS.

According to an embodiment, the method may further include a step of transmitting UE capability information before step S1410. In the step of transmitting UE capability information, the UE transmits the UE capability information to the BS. The UE capability information may include information representing maximum transmission power of each of the panels or information related to a coefficient to be applied to each of the panels.

According to an embodiment, the predetermined coefficient may be a value determined based on the maximum transmission power of each of the panels.

According to an embodiment, the configuration information may include the predetermined coefficient, and the predetermined coefficient may be a value determined based on the maximum transmission power of each of the panels.

According to an embodiment, the precalculated transmission power may be determined based on a type of the uplink signal.

The UL signal may be based on one of Physical Uplink Shared Channel (PUSCH), Physical Uplink Control Channel (PUCCH), Sounding Reference Signal (SRS), or Physical Random Access Channel (PRACH). The precalculated transmission power may be determined based on one of Equation 3 to Equation 6 described above.

According to an embodiment, based on a condition that a summation of the precalculated transmission powers of the activated panels of the plurality of panels is greater than the maximum value, the second transmission power may be based on a specific value. Here, the summation of the precalculated transmission powers may be P_tot of Proposal 1-1 described above. The maximum value may be Pc_max_common.

The specific value may be based on the precalculated transmission power and a scaling coefficient. The specific value and the scaling coefficient may be based on Method 1-1A of Proposal 1-1 described above. Specifically, the specific value may be P_n, and the scaling coefficient may be α_n.

The scaling coefficient may be a value of the maximum value divided by the summation of the precalculated transmission powers.

According to an embodiment, based on a condition that a summation of the precalculated transmission powers of the activated panels of the plurality of panels is greater than the maximum value, the second transmission power for specific panels of the plurality of panels may be based on a specific value. Here, the summation of the precalculated transmission powers may be P_tot of Proposal 1-1 described above. The maximum value may be Pc_max_common.

The specific value may be based on a greater value between panel minimum transmission power and the precalculated transmission power decreased by a predetermined value. The specific value and the predetermined value may be based on Method 1-1B of Proposal 1-1 described above. Specifically, the specific value may be P_nx, and the predetermined value may be P_down_x.

The predetermined value may be a value set to each panel of the specific panels, and a summation of the predetermined values for the specific panels may be equal to or smaller than the summation of the precalculated transmission powers minus the maximum value.

According to step S1420 described above, the operation of the UE (100/200 shown in FIG. 16 to FIG. 20) to determine the transmission power based on the configuration information may be implemented by the apparatus shown in FIG. 16 to FIG. 20. For example, referring to FIG. 17, one or more processors 102 may control one or more transceivers 106 and/or one or more memories 104 to determine the transmission power based on the configuration information.

In step S1430, the UE transmits the UL signal based on the determined transmission power to the BS.

According to an embodiment, the UL signal may be transmitted based on at least one panel of the plurality of panels of the UE.

According to step S1430 described above, the operation of the UE (100/200 shown in FIG. 16 to FIG. 20) to transmit the UL signal based on the determined transmission power to the BS (100/200 shown in FIG. 16 to FIG. 20) may be implemented by the apparatus shown in FIG. 16 to FIG. 20. For example, referring to FIG. 17, one or more processors 102 may control one or more transceivers 106 and/or one or more memories 104 to transmit the UL signal based on the determined transmission power to the BS 200.

Hereinafter, the embodiments described above are described in detail in the aspect of a BS operation with reference to FIG. 15. The methods described below are distinguished only for the convenience of description, and it is understood that a part of component of a method may be replaced by a part of component of another method or may be combined with a part of component of another method.

FIG. 15 is a flowchart for describing a method for a BS to receive a UL signal in a wireless communication system according to another embodiment of the present disclosure.

Referring to FIG. 15, a method for a BS to receive a UL signal in a wireless communication system according to another embodiment of the present disclosure includes a step of transmitting configuration information in relation to transmission power (step S1510) and a step of receiving the UL signal based on determined transmission power (step S1520).

In step S1510, the BS transmits configuration information in relation to transmission power of the UL signal to the UE.

According to an embodiment, the configuration information may include parameters related to the determination of the transmission power. The parameters may include at least one parameter included in the power control parameter set (P_c parameter set).

According to an embodiment, based on a change of the panel for transmitting the UL signal, a value of the parameters may be maintained as a same value before the change of the panel or may be changed to a value set to default.

According to step S1510 described above, the operation of the BS (100/200 shown in FIG. 16 to FIG. 20) to transmit configuration information in relation to transmission power to the UE (100/200 shown in FIG. 16 to FIG. 20) may be implemented by the apparatus shown in FIG. 16 to FIG. 20. For example, referring to FIG. 17, one or more processors 202 may control one or more transceivers 206 and/or one or more memories 204 to transmit configuration information in relation to transmission power to the UE 100.

In step S1520, the BS receives the UL signal based on determined transmission power from the UE.

The determined transmission power may be determined based on the configuration information by the UE. Particularly, the UE may determine the transmission power based on the configuration information and may transmit the UL signal based on determined transmission power to the BS.

According to an embodiment, the transmission power may be determined for each panel of a plurality of panels of the UE. The transmission power may be determined to be a smaller value between a first transmission power and a second transmission power. In this case, the determination of the transmission power may be based on Proposal 1 described above.

According to an embodiment, the first transmission power may be based on a maximum value of a summation of transmission power of each of the plurality of panels. The maximum value may be Pc_max_common of Proposal 1 described above. The second transmission power may be a precalculated transmission power based on an index of each of the panels. The second transmission power may be based on formular_n of Proposal 1 described above.

According to an embodiment, the first transmission power may be based on the maximum value and a predetermined coefficient for each of the panels. The predetermined coefficient for each of the panels may be w_n of Proposal 1 described above.

In one example, the predetermined coefficient may be 1 or an inverse value of the number of activated panels of the plurality of panels. In another example, the predetermined coefficient may be configured based on information configured by the BS.

According to an embodiment, the method may further include a step of receiving UE capability information before step S1510. In the step of receiving UE capability information, the BS receives the UE capability information from the UE. The UE capability information may include information representing maximum transmission power of each of the panels or information related to a coefficient to be applied to each of the panels.

According to an embodiment, the predetermined coefficient may be a value determined based on the maximum transmission power of each of the panels.

According to an embodiment, the configuration information may include the predetermined coefficient, and the predetermined coefficient may be a value determined based on the maximum transmission power of each of the panels.

According to an embodiment, the precalculated transmission power may be determined based on a type of the uplink signal.

The UL signal may be based on one of Physical Uplink Shared Channel (PUSCH), Physical Uplink Control Channel (PUCCH), Sounding Reference Signal (SRS), or Physical Random Access Channel (PRACH). The precalculated transmission power may be determined based on one of Equation 3 to Equation 6 described above.

According to an embodiment, based on a condition that a summation of the precalculated transmission powers of the activated panels of the plurality of panels is greater than the maximum value, the second transmission power may be based on a specific value. Here, the summation of the precalculated transmission powers may be P_tot of Proposal 1-1 described above. The maximum value may be Pc_max_common.

The specific value may be based on the precalculated transmission power and a scaling coefficient. The specific value and the scaling coefficient may be based on Method 1-1A of Proposal 1-1 described above. Specifically, the specific value may be P_n, and the scaling coefficient may be α_n.

The scaling coefficient may be a value of the maximum value divided by the summation of the precalculated transmission powers.

According to an embodiment, based on a condition that a summation of the precalculated transmission powers of the activated panels of the plurality of panels is greater than the maximum value, the second transmission power for specific panels of the plurality of panels may be based on a specific value. Here, the summation of the precalculated transmission powers may be P_tot of Proposal 1-1 described above. The maximum value may be Pc_max_common.

The specific value may be based on a greater value between panel minimum transmission power and the precalculated transmission power decreased by a predetermined value. The specific value and the predetermined value may be based on Method 1-1B of Proposal 1-1 described above. Specifically, the specific value may be P_nx, and the predetermined value may be P_down_x.

The predetermined value may be a value set to each panel of the specific panels, and a summation of the predetermined values for the specific panels may be equal to or smaller than the summation of the precalculated transmission powers minus the maximum value.

According to an embodiment, the UL signal may be transmitted based on at least one panel of the plurality of panels of the UE.

According to step S1520 described above, the operation of the BS (100/200 shown in FIG. 16 to FIG. 20) to receive the UL signal based on determined transmission power from the UE (100/200 shown in FIG. 16 to FIG. 20) may be implemented by the apparatus shown in FIG. 16 to FIG. 20. For example, referring to FIG. 17, one or more processors 102 may control one or more transceivers 206 and/or one or more memories 204 to receive the UL signal based on determined transmission power from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 18 illustrates a signal process circuit for a transmission signal.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 19 illustrates another example of a wireless device applied to the present disclosure.

The wireless device may be implemented in various forms according to a use-case/service (refer to FIG. 16). Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 20 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

The effect of a method and apparatus for transmitting a UL signal in a wireless communication system according to an embodiment of the present disclosure is described as below.

According to an embodiment of the present disclosure, the transmission power is determined for each panel of a plurality of panels of the UE. The transmission power is determined to be a smaller value between a first transmission power and a second transmission power, the first transmission power is based on a maximum value of a summation of transmission power of each of the plurality of panels, and the second transmission power is a precalculated transmission power based on an index of each of the panels.

Therefore, the UL transmission power may be controlled to be proper for the implementation scheme of various multi-panel schemes and the power amplifier (PA) implementation scheme. In addition, not only the transmission power of each panel, but also the transmission power of the entire panels may be controlled together to be maintained as a value in the range which does not influence a body.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method performed by a user equipment (UE) with multiple panels in a wireless communication system, the method comprising:

receiving configuration information related to physical uplink shared channel (PUSCH) repetitions;

transmitting multiple power headroom reports (PHRs) for the PUSCH repetitions associated with multiple SRS resource sets, wherein each of the multiple PHRs is associated with each of the multiple SRS resource sets based on each of the multiple panels related to multiple transmission and reception points (TRPs), respectively.

2. The method of claim 1, wherein the multiple SRS resource sets are related to the multiple panels of the UE for the PUSCH repetitions, wherein a transmission power of the PUSCH repetitions is determined to be a smaller value between a first transmission power and a second transmission power, and wherein the first transmission power is based on a maximum value of a summation of transmission power of each of the multiple panels, and the second transmission power is a precalculated transmission power based on an index of each of the multiple panels, wherein the first transmission power is based on the maximum value and a predetermined coefficient for each of the multiple panels.

3. The method of claim 2, wherein the predetermined coefficient is 1 or an inverse value of a number of activated panels of the multiple panels.

4. The method of claim 2, wherein the predetermined coefficient is configured based on information configured by a base station.

5. The method of claim 2, further comprising transmitting UE capability information, wherein the UE capability information includes information representing maximum transmission power of each of the multiple panels or information related to a coefficient to be applied to each of the multiple panels.

6. The method of claim 5, wherein the predetermined coefficient is a value determined based on the maximum transmission power of each of the multiple panels.

7. The method of claim 5, wherein the configuration information includes the predetermined coefficient, and the predetermined coefficient is a value determined based on the maximum transmission power of each of the multiple panels.

8. The method of claim 2, wherein the precalculated transmission power is determined based on a type of the uplink signal.

9. The method of claim 8, wherein, based on a condition that a summation of the precalculated transmission powers of the activated panels of the multiple panels is greater than the maximum value, the second transmission power is based on a pre-defined value.

10. The method of claim 9, wherein the pre-defined value is based on the precalculated transmission power and a scaling coefficient.

11. The method of claim 10, wherein the scaling coefficient is a value of the maximum value divided by the summation of the precalculated transmission powers.

12. The method of claim 8, wherein, based on a condition that a summation of the precalculated transmission powers of the activated panels of the multiple panels is greater than the maximum value, the second transmission power for pre-defined panels of the multiple panels is based on a pre-defined value.

13. The method of claim 12, wherein the pre-defined value is based on a greater value between panel minimum transmission power and the precalculated transmission power decreased by a predetermined value.

14. The method of claim 13, wherein the predetermined value is a value set to each panel of the pre-defined panels, and wherein a summation of the predetermined values for the pre-defined panels is equal to or smaller than the summation of the precalculated transmission powers minus the maximum value.

15. The method of claim 1, wherein the configuration information includes parameters related to the determination of the transmission power.

16. The method of claim 15, wherein the multiple SRS resource sets are related to the multiple panels of the UE for the PUSCH repetitions,
wherein, based on a change of a panel, among the multiple panels, for the PUSCH repetitions, a value of the parameters is maintained as a same value before the change of the panel or changed to a value set to default.

17. A user equipment (UE) with multiple panels in a wireless communication system, comprising:
one or more transceivers;
one or more processors; and
one or more memories operably accessible to the one or more processors, and configured to store instructions for operations performed by the one or more processors,
wherein the operations include:
receiving configuration information related to physical uplink shared channel (PUSCH) repetitions;
determining multiple power headroom reports (PHRs) for the PUSCH repetitions associated with multiple SRS resource sets; and
transmitting the multiple PHRs,
wherein each of the multiple PHRs is associated with each of the multiple SRS resource sets based on each of the multiple panels related to multiple transmission and reception points (TRPs), respectively.

18. One or more non-transitory computer readable medium for storing one or more commands,
wherein the one or more commands executable by one or more processors are configured for a user equipment (UE) with multiple panels to perform operations comprising:
receiving configuration information related to physical uplink shared channel (PUSCH) repetitions;
determining multiple power headroom reports (PHRs) for the PUSCH repetitions associated with multiple SRS resource sets; and
transmitting the multiple PHRs,
wherein each of the multiple PHRs is associated with each of the multiple SRS resource sets based on each of the multiple panels related to multiple transmission and reception points (TRPs), respectively.

* * * * *